(12) United States Patent
Shinohara

(10) Patent No.: US 8,891,422 B2
(45) Date of Patent: Nov. 18, 2014

(54) COMMUNICATION SYSTEM, COMMUNICATION TERMINAL, COMMUNICATION DEVICE, COMMUNICATION CONTROL METHOD, AND COMMUNICATION CONTROL PROGRAM

(75) Inventor: Masahito Shinohara, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 134 days.

(21) Appl. No.: 13/636,938

(22) PCT Filed: Apr. 15, 2011

(86) PCT No.: PCT/JP2011/059883
§ 371 (c)(1),
(2), (4) Date: Sep. 24, 2012

(87) PCT Pub. No.: WO2011/132761
PCT Pub. Date: Oct. 27, 2011

(65) Prior Publication Data
US 2013/0016710 A1    Jan. 17, 2013

(30) Foreign Application Priority Data
Apr. 19, 2010 (JP) .................... 2010-095834

(51) Int. Cl.
*H04W 84/00* (2009.01)
*H04M 1/725* (2006.01)
*H04W 88/02* (2009.01)
*H04W 84/12* (2009.01)
*H04W 84/20* (2009.01)

(52) U.S. Cl.
CPC ........ *H04M 1/7253* (2013.01); *H04M 2250/06* (2013.01); *H04W 84/12* (2013.01); *H04M 2250/52* (2013.01); *H04W 88/02* (2013.01); *H04W 84/20* (2013.01)
USPC .......................... 370/310.2; 370/328; 370/338

(58) Field of Classification Search
None
See application file for complete search history.

(56) References Cited

U.S. PATENT DOCUMENTS

| | | | |
|---|---|---|---|
| 2007/0135162 A1* | 6/2007 | Banerjea et al. | 455/556.1 |
| 2007/0242788 A1* | 10/2007 | Huang | 375/358 |
| 2009/0290553 A1* | 11/2009 | Matsukura et al. | 370/329 |
| 2010/0165958 A1* | 7/2010 | Roy et al. | 370/338 |
| 2010/0296455 A1 | 11/2010 | Nakajima | |
| 2011/0128943 A1* | 6/2011 | Shan | 370/338 |

FOREIGN PATENT DOCUMENTS

| | | |
|---|---|---|
| JP | 2006-157814 A | 6/2006 |
| JP | 2006-157815 A | 6/2006 |
| JP | 2009-225060 A | 10/2009 |

* cited by examiner

*Primary Examiner* — Chi Pham
*Assistant Examiner* — Shick Hom
(74) *Attorney, Agent, or Firm* — Sughrue Mion, PLLC

(57) ABSTRACT

A communication system includes: a communication device having information provision unit for providing information on a communication state; and a communication terminal including information acquisition unit for acquiring the information on the communication state, and wireless LAN communication unit for operating either in a station (STA) mode for connecting with an access point or in an AP mode for operating as the access point (AP) based on the acquired information. The communication terminal connects with the access point in the case that the communication terminal operates in the STA mode, and the communication device connects with the communication terminal in the case that the communication terminal operates in the AP mode.

13 Claims, 20 Drawing Sheets

COMMUNICATION SYSTEM, COMMUNICATION TERMINAL, COMMUNICATION DEVICE, COMMUNICATION CONTROL METHOD, AND COMMUNICATION CONTROL PROGRAM

CROSS REFERENCE TO RELATED APPLICATIONS

This application is a National Stage of International Application No. PCT/JP2011/059883 filed Apr. 15, 2011, claiming priority based on Japanese Patent Application No. 2010-095834, filed Apr. 19, 2010, the contents of all of which are incorporated herein by reference in their entirety.

TECHNICAL FIELD

This invention relates to a communication system, a communication terminal, a communication device, a communication control method and a communication control program.

BACKGROUND ART

A mobile communication terminal such as a mobile phone is, by transmitting and receiving digital data with a mobile phone base station, executing wireless communications via the base station.

In recent years, in accordance with an increase of public facilities or the like each having an AP (access point) for a wireless LAN (Local Area Network), a demand for connecting a mobile phone with an internet using the access point is increasing.

When a wireless LAN interface is mounted onto the mobile phone, the mobile phone can connect with the wireless LAN access point and access the internet.

For example, patent literature 1 and patent literature 2 describe a configuration and a wireless LAN setting method of a mobile phone adapted for the wireless LAN, provided with the wireless LAN interface.

In general, complicated procedures are required for the connection with the access point. The mobile phone disclosed in these patent literatures has an imaging means, such as a camera, and takes a picture of a QR-code (Quick Response Code, registered trademark) attached to a housing of the access point. The QR-code stores setting information for connecting with the access point of the wireless LAN. By taking a picture of the QR-code by the imaging means, and analyzing the QR-code, the mobile phone acquires the setting information stored in the QR-code, and sets the connection with the wireless LAN. As a result, a user of the mobile phone can connect with the wireless LAN without the complicated connection procedures.

CITATION LIST

Patent Literature

[Patent Literature 1] Japanese Patent Application Laid-Open No. 2006-157814
[Patent Literature 2] Japanese Patent Application Laid-Open No. 2006-157815

SUMMARY OF INVENTION

Technical Problem

On the other hand, there is a demand of exchanging data between a terminal such as a PC (Personal Computer) equipped with a wireless LAN interface and the mobile phone. The process of the data exchange includes transmitting data, created by or acquired at the PC, to the mobile phone to use at the mobile phone, or transmitting data, acquired at the mobile phone acquired, to the PC.

At that time, outside a service area where the service of the wireless LAN is provided, the PC cannot connect to the wireless LAN. In such a state (i.e. PC is in a stand alone state), a process of directly connecting the mobile phone with the PC is necessary.

Furthermore, under the circumstance where the wireless LAN is available, the mobile phone may be connected to the wireless LAN, and connected with the PC via the access point, to which the PC belongs.

In this way, the method for connecting the mobile phone is changed according to whether the PC is in the state where the PC is connected to the access point and the PC belongs to the access point, or the PC is in a standalone state since there is no access point available around the PC or the like. That is, in accordance with the destination of the connection, a user has to change the setting of the connection mode of the mobile phone.

However, complicated operations are required for a process of checking the connection state of the PC, changing the connection mode of the mobile phone and connecting with the PC. That is, such a system including the mobile phone and the PC, as above, has a problem that a process, for a user to connect the mobile communication terminal in accordance with the state of the communication device, is quite complicated.

While the above-mentioned patent literatures 1 and 2 describe a setting process of connecting the mobile phone, equipped with the wireless LAN communication unit function, with the access point, a process of directly connecting the mobile phone with other communication devices, such as the PC, via the wireless LAN is not described. For this reason, according to the process described in patent literatures 1 and 2, the above-mentioned problem cannot be solved.

In addition, as mentioned above, regarding other communication devices, a state of the communication device, such as the state of connecting with the access point or the state of being activated in stand alone, cannot be uniquely defined, according to whether being connected with the wireless LAN or not. For this reason, in accordance with the state of the communication device, the connection process for the mobile phone needs to be changed. The process of connecting by a connection method suitable for the state of the communication device is not described in patent literatures 1 and 2. For this reason, the above-mentioned problem is not solved by the process described in patent literatures 1 and 2.

The object of the present invention is to solve the above problem, and to provide a mobile communication terminal, a communication device, a communication system, a communication control method and a communication control program, wherein the mobile communication terminal can be easily connected in accordance with a state of the communication device.

Solution to Problem

In order to solve the above-mentioned problem, a communication system of the present invention, comprising: a communication device; and a communication terminal which communicates with the communication device, is characterized in that the communication device has an information provision means for providing information on a communication state to the communication terminal, the communication terminal comprising: an information acquisition means for acquiring the information on the communication state of the communication device; and a wireless LAN communication means for operating either in a station (STA) mode for connecting with an access point or in an AP mode for operating as the access point (AP) based on the acquired information, and the communication terminal connects with the access point in the case that the communication terminal operates in the STA mode, and the communication device connects with the communication terminal in the case that the communication terminal operates in the AP mode.

In order to solve the above-mentioned problem, a communication terminal of the present invention, which communicates with a communication device, is characterized by comprising: an information acquisition means for acquiring information concerning a communication state of the communication device; and a wireless LAN communication means for operating either in a station (STA) mode for connecting with an access point or in an AP mode for operating as the access point (AP) based on the acquired information, wherein the communication terminal connects with the access point in the case of operating in the STA mode, and the communication device connects with the communication terminal in the case of operating in the AP mode.

In order to solve the above-mentioned problem, a communication device of the present invention, which communicates with a communication terminal, is characterized by comprising: an information provision means for providing information concerning a communication state to the communication terminal, wherein the communication terminal operates either in a station (STA) mode for connecting with an access point or in an AP mode for operating as the access point (AP) based on the information concerning the communication state, and the communication terminal connects with the access point in the case that the communication terminal operates in the STA mode, and the communication device connects with the communication terminal in the case that the communication terminal operates in the AP mode.

In order to solve the above-mentioned problem, a communication control method for controlling a communication between a communication terminal and a communication device according to the present invention, is characterized by comprising: an information acquisition step for acquiring information concerning a communication state of the communication device, and a connection step for either (1) operating the communication terminal in a station (STA) mode and connecting the communication terminal with an access point, or (2) operating the communication terminal in an access point (AP) mode and connecting the communication device with the communication terminal, based on the information concerning the communication state.

In order to solve the above-mentioned problem, a communication control program of the present invention, is characterized by executing with a computer for executing: an information acquisition function for acquiring information concerning a communication state of a communication device; and a connection function for either (1) operating a communication terminal in a station (STA) mode and connecting the communication terminal with an access point, or (2) operating the communication terminal in an access point (AP) mode and connecting the communication device with the communication terminal, based on the information concerning the communication state.

Advantageous Effects of Invention

According to the present invention, because the mobile communication terminal reads out the information concerning the communication state of the communication device, to which the user is to connect, and operates in a STA (station) mode or in an AP (access point) mode based on the information, the mobile communication terminal is connected with the communication device by the connection method suitable for the communication state of the communication device. As a result, because the user needs not to check the connection configuration of the communication device, and needs not to perform the connection setting for the mobile communication terminal, the user can connect the mobile communication terminal with the communication device easily.

DESCRIPTION OF EMBODIMENTS

The present invention will be described referring to exemplary embodiments.
[First Exemplary Embodiment]
At first, the first exemplary embodiment of the present invention will be described with reference to FIGS. 1 and 2.

Figure 1:
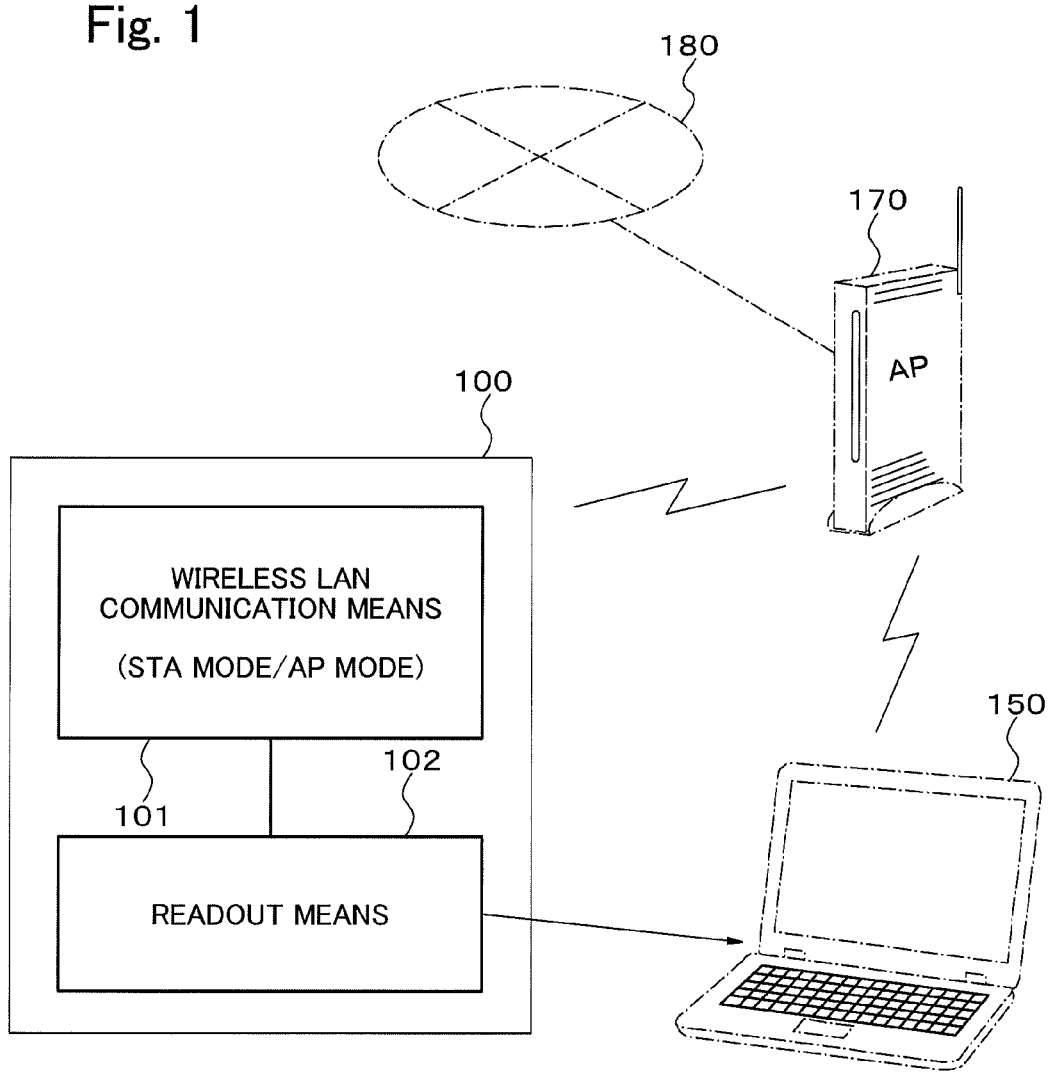
FIG. 1 shows an example of a configuration of a mobile communication terminal according to a first exemplary embodiment of the present invention.
Figure 2:
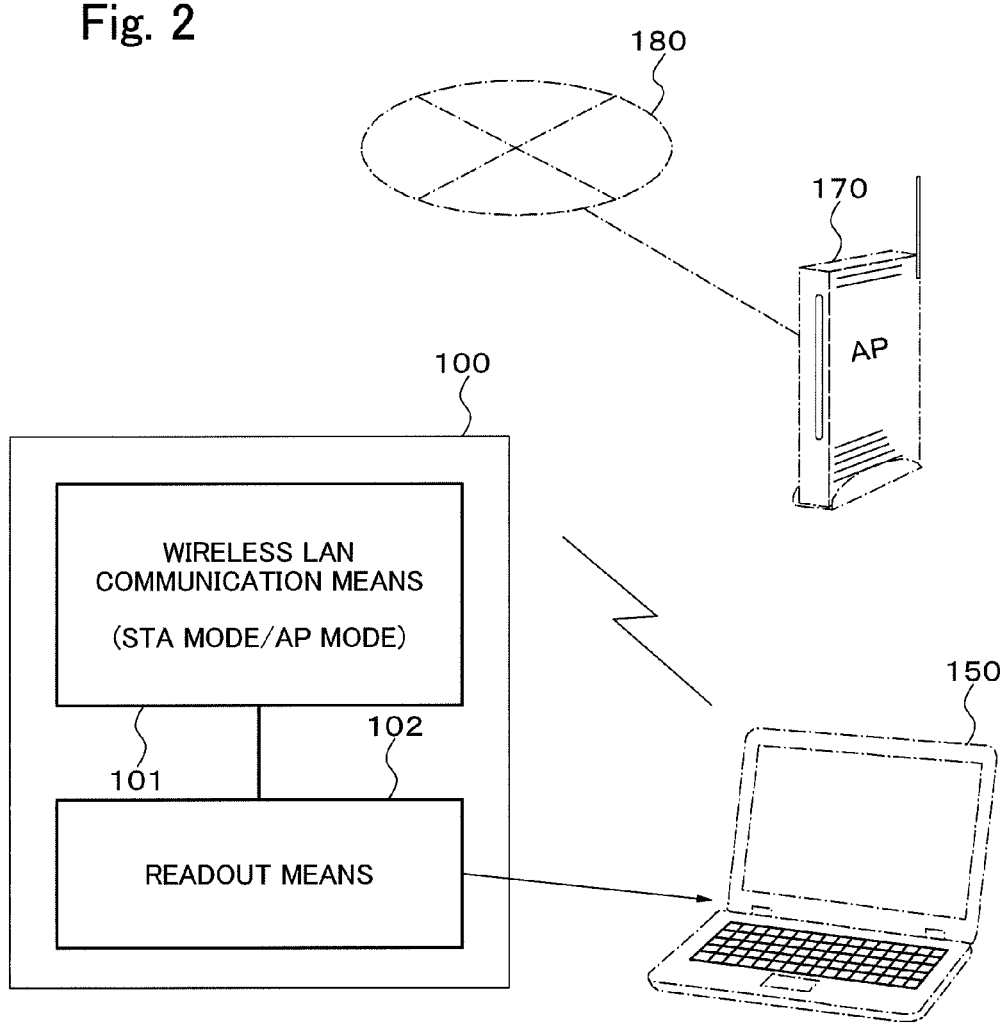
FIG. 2 shows an example of a configuration of the mobile communication terminal in another communication state according to the first exemplary embodiment of the present invention.

FIGS. 1 and 2 show an example of a configuration of a mobile communication terminal according to the first exemplary embodiment. FIGS. 1 and 2 are different in a communication state of the mobile communication terminal.

A mobile communication terminal 100 in FIGS. 1 and 2 includes a wireless LAN communication means 101 and a readout means 102.

The wireless LAN communication means 101 operates in a STA (station) mode to connect with an AP (access point) 170 or in an AP (access point) mode to operate as the access point. These modes can be switched to each other.

In addition, for example, the wireless LAN communication means 101 is a communication means following to one of the communication standards among IEEE (Institute of Electrical and Electronic Engineers) 802.11a/b/g/n. Further, for example, the wireless LAN communication means 101 connects with a communication device 150 or with the access point 170 for connecting with an internet 180.

The above-mentioned STA mode is a mode where the mobile communication terminal 100 connects with the access point 170, and is also called either a station mode or a terminal mode. Alternatively, the above-mentioned AP mode is a mode where the mobile communication terminal 100 operates as an AP (access point) of the wireless LAN, and is also called either an access point mode or a base station mode.

The readout means 102 is a means to read out information concerning a communication state of the communication device 150. The information concerning the communication state of the communication device 150 includes the information on, for example, whether or not the communication device 150 connects with the access point 170.

Further, for example, when the communication device 150 connects with the access point 170, the information concerning the communication state includes a setting value required for the connection from the mobile communication terminal 100 to the access point 170. In addition, when the communication device 150 does not connect with the access point 170, the information concerning the communication state includes the setting value required for the connection from the communication device 150 to the mobile communication terminal 100. Also, as the readout means 102, as an example, a camera (i.e. an imaging means) which reads out information displayed on the communication device 150 or a wireless tag reader which reads out information stored in the wireless tag of the communication device 150 can be used.

The mobile communication terminal 100, following to the described configuration, is determined either in the STA mode or in the AP mode of the operation mode, based on the information read out by the readout means 102. For example, when the communication device 150 connects with the access point 170, the mobile communication terminal 100 operates in the STA mode and connects with the access point 170. As a result, the mobile communication terminal 100 connects with the communication device 150 (refer to FIG. 1). Alternatively, when the communication device 150 does not connect with the access point 170, that is, when the communication device 150 is in a stand alone state, the mobile communication terminal 100 operates in the AP mode based on the setting value acquired by the readout. The communication device 150 connects with the mobile communication terminal 100 which operates under this kind of state (refer to FIG. 2).

According to the first exemplary embodiment, the mobile communication terminal 100 reads out the information concerning the communication state of the communication device 150, with which the user is to connect, and determines the operation mode among the STA mode or the AP mode based on the information. Therefore, according to the first exemplary embodiment, the mobile communication terminal 100 connects with the communication device 150 by a connection method determined in accordance with the communication state of the communication device 150.

In the system including the mobile communication terminal and the communication device according to the first exemplary embodiment, a user does not need to check a connection topology of the communication device 150. In addition, the user does not need to change the setting of the connection of the mobile communication terminal 100 in accordance with the connection topology. Accordingly, the user becomes released from the complicated operations in the connection process of the mobile communication terminal 100 with the communication device 150.
[Second Exemplary Embodiment]
Next, the second exemplary embodiment of the present invention will be described with reference to FIGS. 3 to 7.

Figure 3:
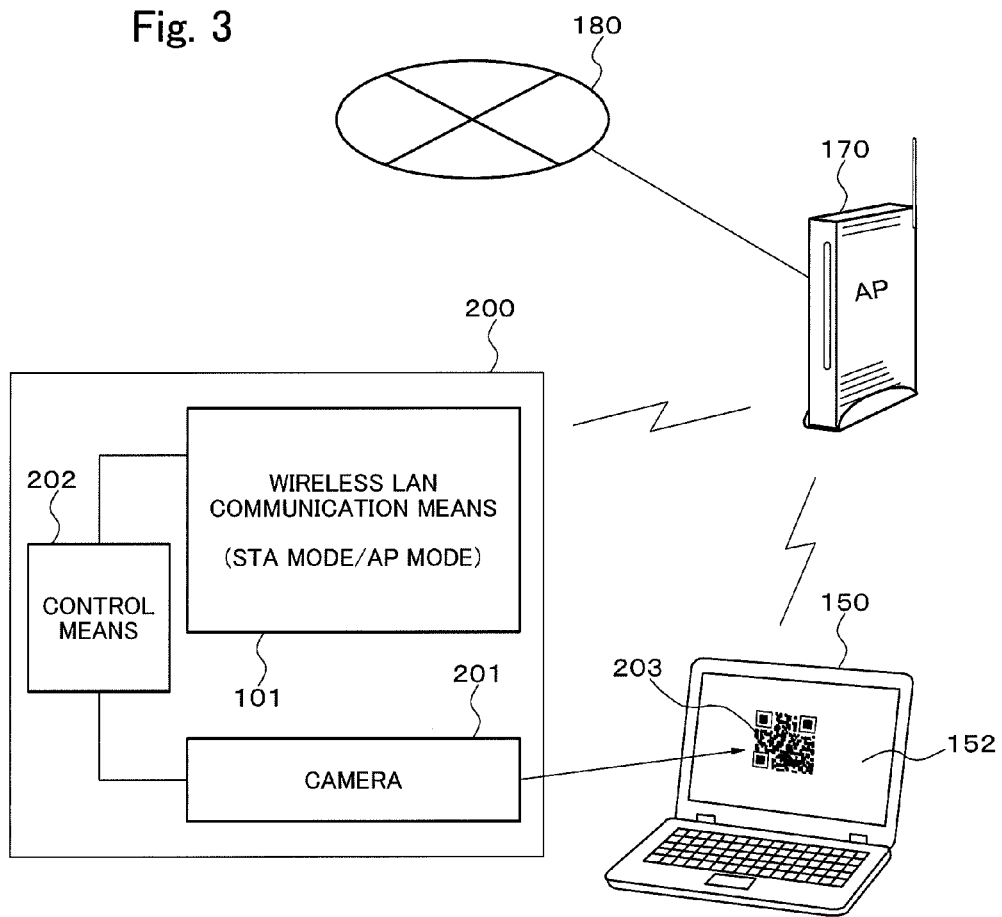
FIG. 3 shows an example of a configuration of the mobile communication terminal according to a second exemplary embodiment of the present invention.
Figure 4:
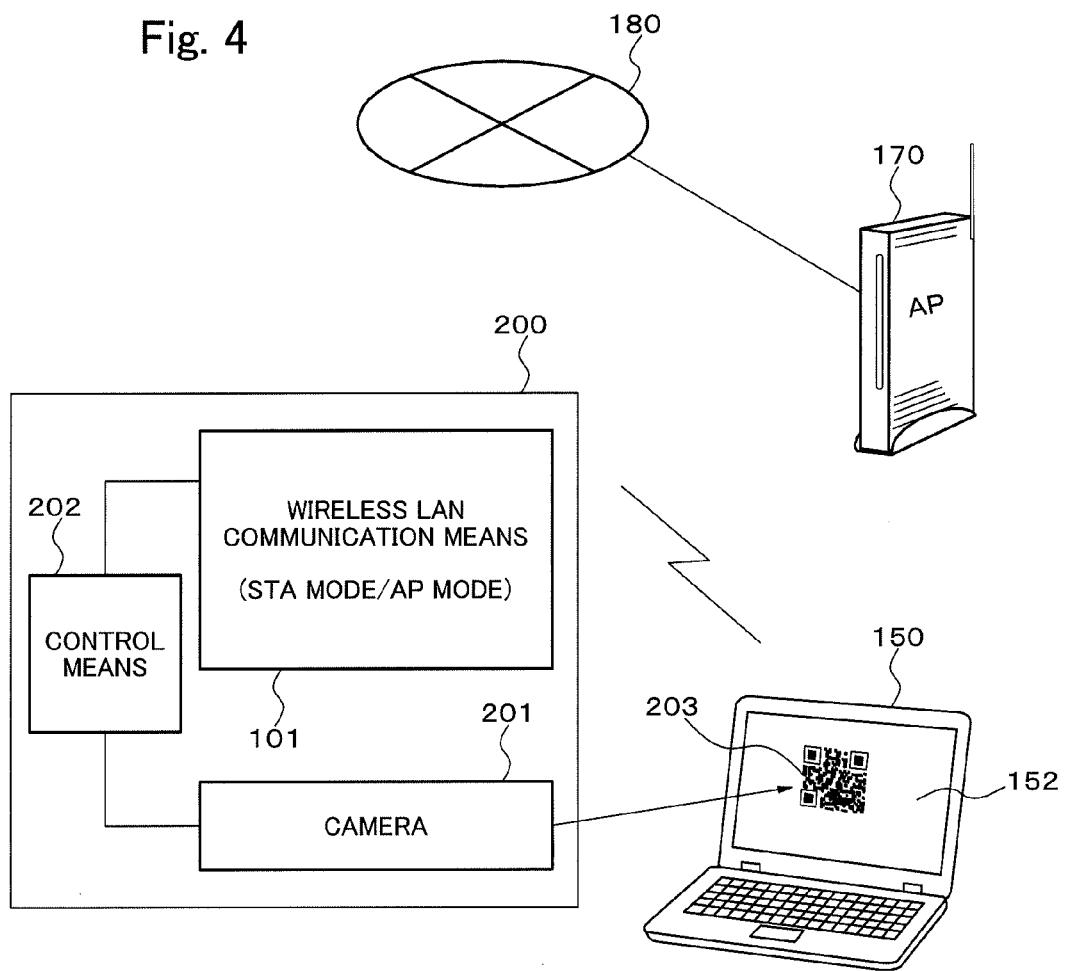
FIG. 4 shows an example of a configuration of the mobile communication terminal in another communication state according to the second exemplary embodiment of the present invention.
Figure 5:
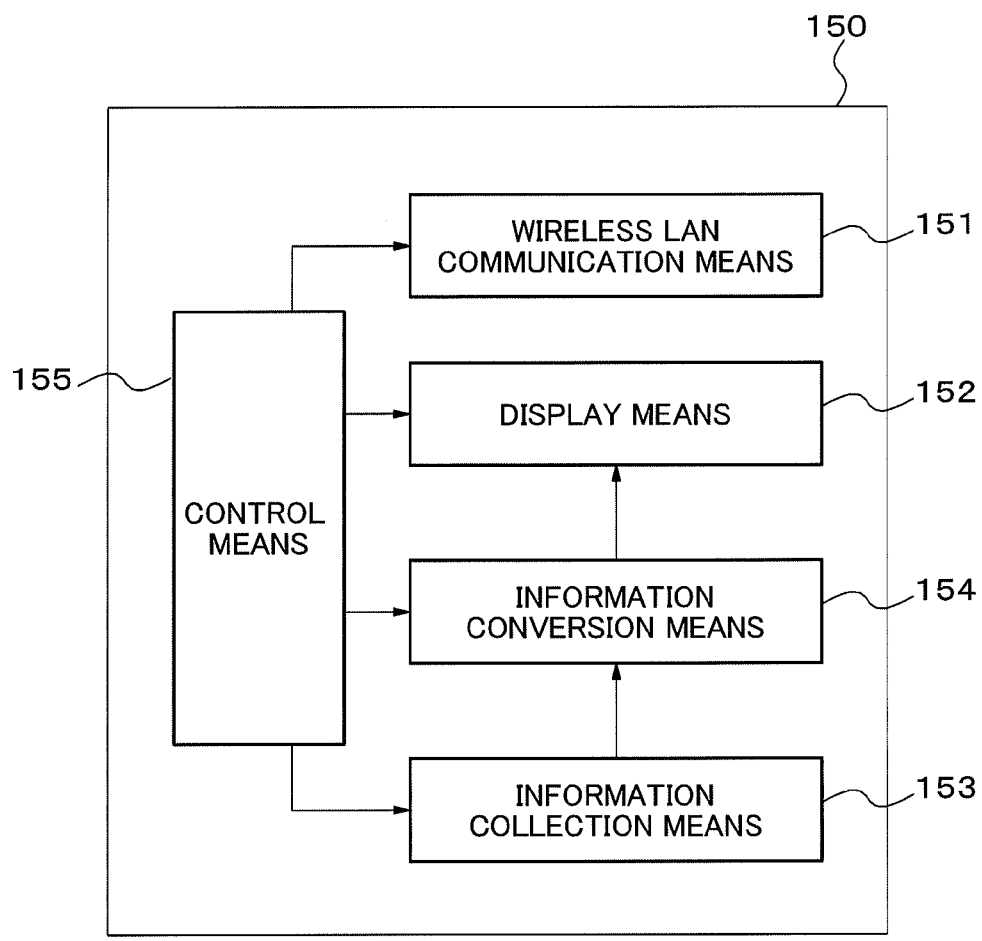
FIG. 5 shows an example of a configuration of a communication device which is communicated with the mobile communication terminal according to the second exemplary embodiment of the present invention.
Figure 6:
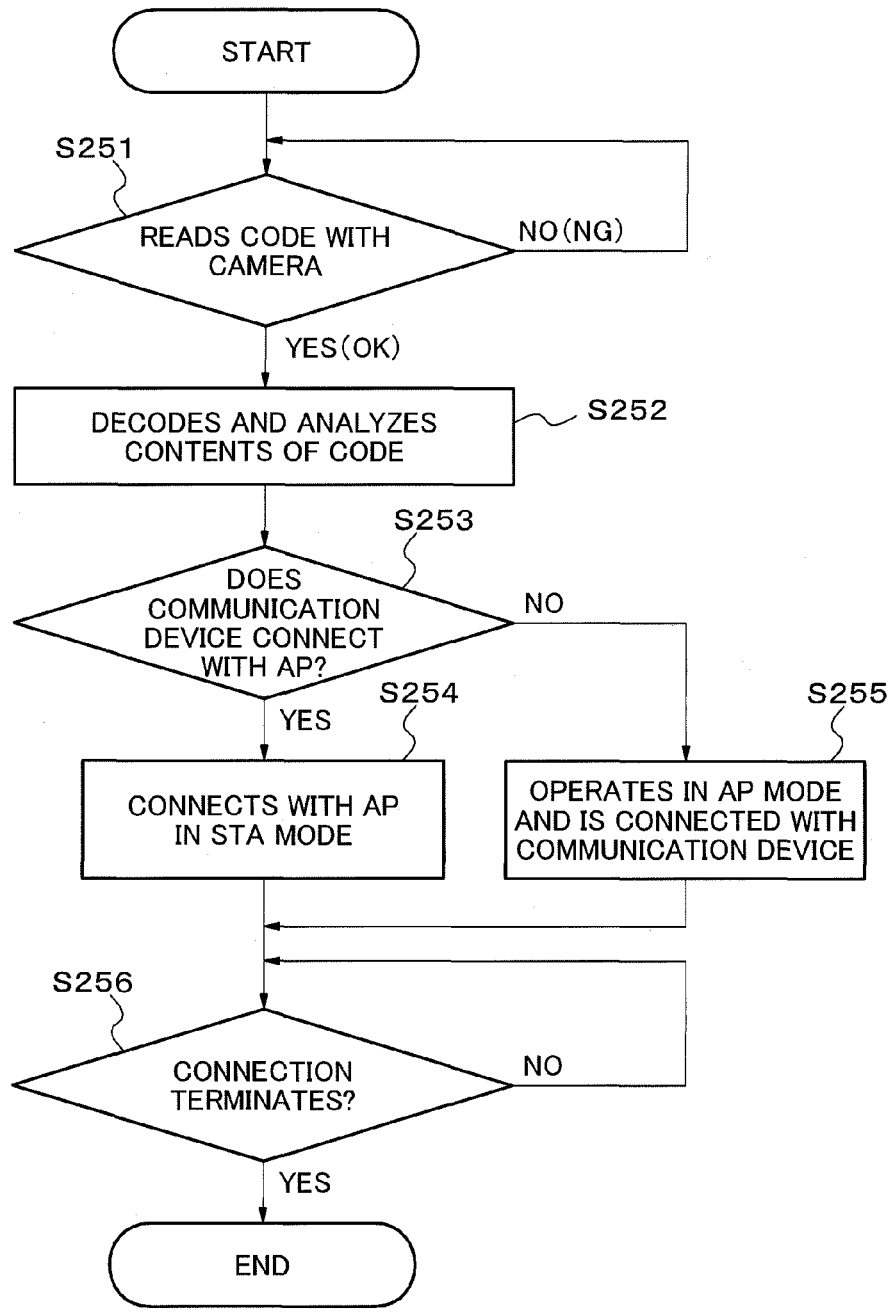
FIG. 6 is a flowchart showing an example of an operation of the mobile communication terminal according to the second exemplary embodiment of the present invention.
Figure 7:
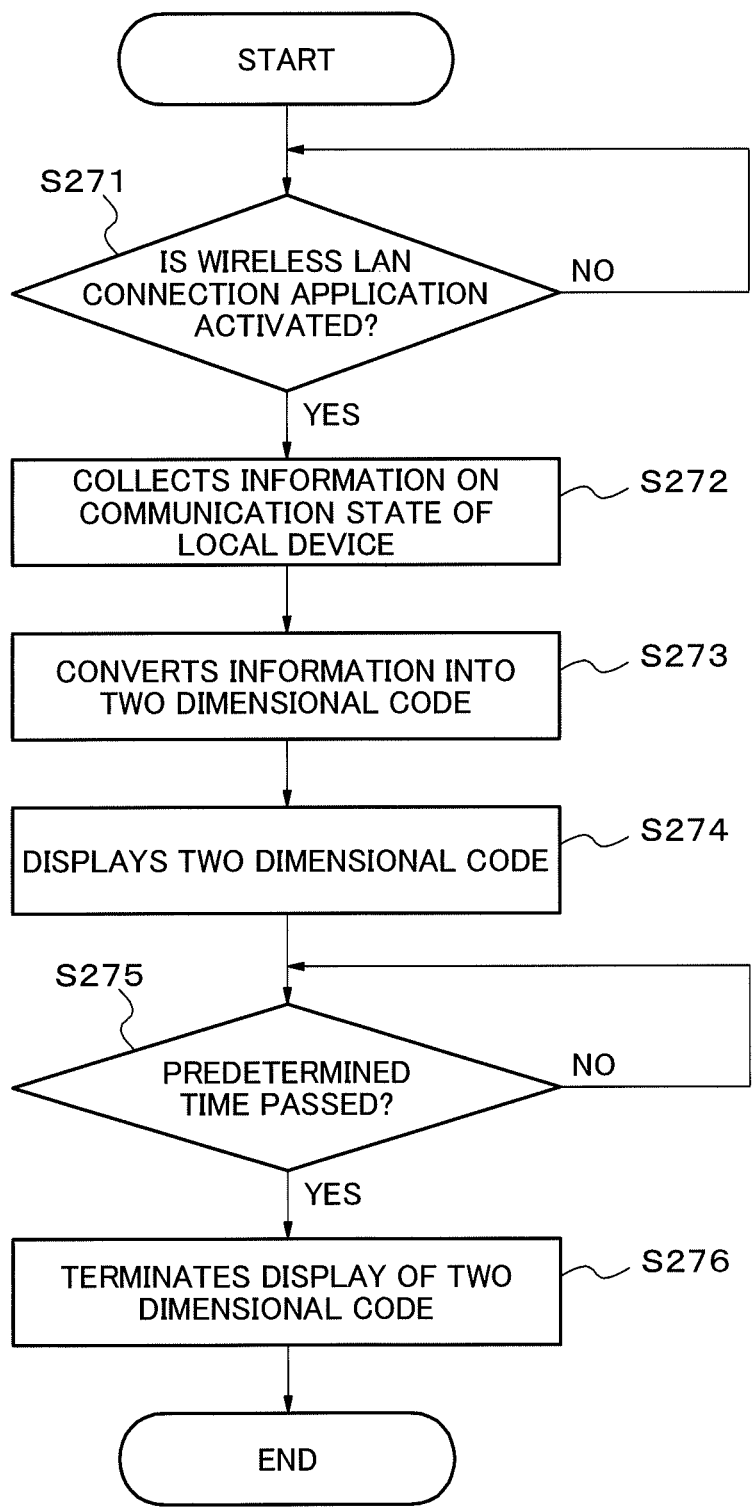
FIG. 7 is a flowchart showing an example of an operation of displaying a two dimensional code on a communication device which is communicated with the mobile communication terminal according to the second exemplary embodiment of the present invention.

FIGS. 3 and 4 show an example of a configuration of the mobile communication terminal according to the second exemplary embodiment. FIG. 3 is different from FIG. 4 on the point of the communication state of the mobile communication terminal. FIG. 5 shows an example of the configuration of the communication device 150 which is communicated with a mobile communication terminal 200 according to the second exemplary embodiment. FIG. 6 is a flowchart showing the example of the connection process in the mobile communication terminal 200 according to the second exemplary embodiment. FIG. 7 is the flowchart showing the example of the process of displaying a two dimensional code in the communication device 150 which is communicated with the mobile communication terminal 200 according to the second exemplary embodiment. Also, an identical code is affixed to a component identical with the component described in the first exemplary embodiment, and the description will be omitted or simply referred.

The mobile communication terminal 200 shown in FIGS. 3 and 4 includes the wireless LAN communication means 101, a camera 201 and control means 202.

For example, the wireless LAN communication means 101 is the communication means which operates following to one of the communication standards among IEEE 802.11a/b/g/n.

The camera 201 is a readout means which reads out information concerning the communication state of the communication device 150. Specifically, the camera 201 takes a picture of a two dimensional code 203 (e.g. QR-code) displayed on a display means 152 of the communication device 150, and acquires the information included in the QR-code.

The two dimensional code 203 includes information on the communication state of the communication device 150, that is, the information on whether or not the communication device 150 connects with the access point 170. Further, the two dimensional code 203 includes the setting value required for the connection to the access point 170 when the communication device 150 connects with the access point 170, and it includes the setting value required for the connection to the mobile communication terminal 200 when the communication device 150 does not connect with the access point 170.

When the communication device 150 connects with the access point 170, the displayed two dimensional code 203 includes information indicating the connection and the setting value (including an ESSID (Extended Service Set Identifier) for connecting with the access point 170) required for the connection process from the mobile communication terminal 200 to the access point 170. Alternatively, when the communication device 150 does not connect with the access point 170, the displayed two dimensional code 203 includes information indicating the non-connection and the setting value (including the ESSID which the communication device 150 created) required for the connection process from the communication device 150 to the mobile communication terminal 200.

The control means 202 controls the operation of each means in the mobile communication terminal 200. In addition, the control means 202 has a function of decoding the information of the two dimensional code 203 which is read by the camera 201, and further controls the operation in the STA mode or in the AP mode based on the decoded information.

The communication device 150 shown in FIG. 5 includes a wireless LAN communication means 151 and the display means 152. Further, the communication device 150 includes an information collection means 153 and an information conversion means 154.

The wireless LAN communication means 151 is, for example, the communication means which operates following to one of the communication standards among IEEE802.11a/b/g/n. The display means 152 serves information concerning the communication state of the communication device 150 to the mobile communication terminal 200. The mobile communication terminal 200 reads out the information. The display means 152 displays the two dimensional code 203 which is created by the following procedure. For example, such as a liquid crystal display device is used as the display means 152.

The information collection means 153 collects the information concerning the communication state of the communication device 150. The information concerning the communication state of the communication device 150 includes information indicating whether or not the communication device 150 connects with the access point 170. Further, when the communication device 150 connects with the access point 170, the information concerning the communication state of the communication device 150 includes the information indicating connecting with the access point 170 and the setting value required for the connection. Alternatively, when the communication device 150 does not connect with the access point 170, the information includes the information that the communication device 150 does not connect with the access point 170 and the setting value required for the connection from the communication device 150 to the mobile communication terminal 200. Also, the setting value required for the connection from the communication device 150 to the mobile communication terminal 200 is created by a control means 155 as an example.

The information conversion means 154 creates the two dimensional code 203 based on the information received from the information collection means 153. In addition, the control means 155 controls the operation of each means in the communication device 150 by a control program.

The process in the mobile communication terminal 200 according to the present exemplary embodiment will be described with reference to FIGS. 6 and 7.

FIG. 7 is a flowchart showing the example of the process of displaying the two dimensional code 203 in the communication device 150.

In Step 271 (hereinafter, each step is denoted as "Sxxx"), the control means 155 of the communication device 150 judges whether or not the wireless LAN connection application has been activated. With the wireless LAN connection application, the communication device 150 connects with the access point 170.

When the wireless LAN connection application is judged to be activated (Yes in S271), by the control of the control means 155, the information collection means 153 collects the information concerning the communication state of the communication device 150 (S272).

Then, the information conversion means 154 converts (i.e. encode) the collected information into the two dimensional code 203 (S273). The converted two dimensional code 203 is displayed on the display means 152 (S274).

Then, the control means 155 judges whether or not a predetermined time has passed (S275), and the control means 155 terminates the display of the two dimensional code 203 on the display means 152 (S276) when the predetermined time has passed (Yes in S275).

As is described above, the communication device 150 displays the two dimensional code 203 so that the mobile communication terminal 200 can read out the information concerning the communication state of the communication device 150.

Then, the operation of the mobile communication terminal 200 according to the present exemplary embodiment will be described with reference to the flowchart in FIG. 6.

When a user desires a connection with the communication device 150, it takes a picture of the two dimensional code 203 displayed on the communication device 150 with the camera 201 of the mobile communication terminal 200. The control means 202 of the mobile communication terminal 200 judges whether or not the two dimensional code 203 was read out by the camera 201 (S251). When it is judged that the two dimensional code 203 was read out by the camera 201 (Yes in S251), the control means 202 decodes the information included in the two dimensional code 203 and analyzes the decoded information (S252). Then, the control means 202 judges whether or not the communication device 150 intends to connect with the access point 170 (S253).

When the communication device 150 is connected with the access point 170 (Yes in S253), the control means 202 controls so that the mobile communication terminal 200 can connect with the access point 170 in the STA mode by using the setting value required for the connection to the access point 170 and included in the readout information (S254).

Alternatively, when it does not connect the communication device 150 with the access point 170 (No in S253), the control means 202 controls so that the mobile communication terminal 200 can operate in the AP mode and connects with the communication device 150 based on the setting value which is included in the readout information and is required for the connection to the communication device 150 (S255).

The control means 202 judges whether or not the connection is terminated (S256), and continues the connection until it is judges that the connection is terminated (Yes in S256).

According to the present exemplary embodiment, the mobile communication terminal 200 reads out the information concerning the communication state of the communication device 150 with which the user desires to connects, and operates in the STA mode or in the AP mode based on the information. As a result, the mobile communication terminal 200 connects with the communication device 150 in the state in accordance with the communication state of the communication device 150.

According to the present exemplary embodiment, even if the user does not recognize the connection state of the communication device 150 and the mobile communication terminal 200 by a visual recognition, it is possible to execute a process of the connection between the mobile communication terminal 200 and the communication device 150 via the access point 170 or directly. For this reason, the connection procedure of the communication device 150 with the mobile communication terminal 200 by the user will be simplified.

Further, while in the above-mentioned description, the QR-code was adopted and the information is displayed on the communication device 150, as an example of the two dimensional code, it is not limited to this, and other method of the two dimensional code can be adopted. Furthermore, in addition to the two dimensional code, it can adopt other one-dimensional code such as a barcode. Moreover, it can adopt such as characters, which the user can read out, or characters including symbols. Alternatively, a character string such as a passphrase can be adopted. When the character string is adopted, it brings an effect that it gives a sense of security to the user, because the state of connection is notified to the user by setting the readable characters for the user.

As the information displayed on the communication device 150, a pattern of a movement of a display position of a cursor or a mouse pointer which are displayed on the communication device 150 can be adopted. The pattern of the movement can include a pattern of a blink, such as the Morse code. Further, symbols or predetermined figures can be used instead of the cursor or the mouse pointer. In this case, the mobile communication terminal 200 decodes the above-mentioned movement or the pattern of the blink to the information concerning the communication state of the communication device 150, and acquires the required information. Further, although the above-mentioned cursor, mouse pointer, symbols and figures or the like can be displayed on the display unit of the communication device 150, it can be displayed on another display means other than the communication device 150. Further, when the communication device 150 has a projection function, a character such as a cursor or figures can be projected and displayed onto a wall.

Further, a medium for transmitting the above-mentioned information is not limited to the above-mentioned optical signal transmission medium, and it can be any medium which is readable in the communication with the communication device 150. For example, the information can be stored in a wireless tag, which is not illustrated, in the communication device 150. In this case, the mobile communication terminal 200 has the readout means which reads out the information of the wireless tag of the communication device 150.

In addition, the mobile communication terminal 200 communicates with the communication device 150 using a short range infrared communication such as IrDA (Infrared Data Association), and can read out the information from the communication device 150. Also, a RFID (Radio Frequency Identification) tag can be nominated as an example of the wireless tag. The RFID tag includes an ID tag, a wireless IC (Integrated Circuit) tag, a noncontact IC tag and an electronic tag.

[Third Exemplary Embodiment]

Next, the third exemplary embodiment of the present invention will be described with reference to FIG. 8.

Figure 8:
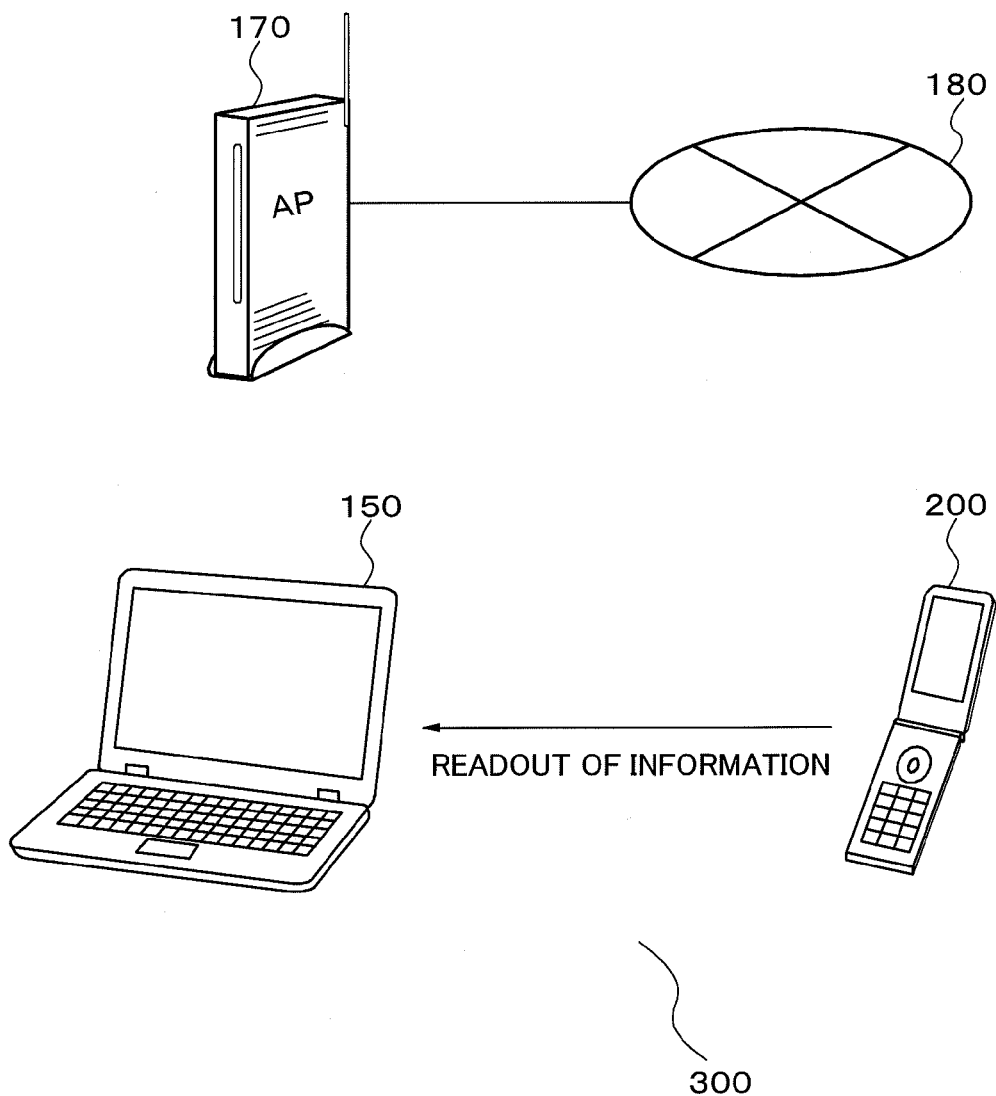
FIG. 8 shows an example of a configuration of the communication system according to the third exemplary embodiment of the present invention.

FIG. 8 shows an example of the configuration of the communication system according to the third exemplary embodiment.

A communication system 300 according to the present exemplary embodiment includes the mobile communication terminal 200 and the communication device 150 that are described in the second exemplary embodiment. In addition, the mobile communication terminal 100 described in the first exemplary embodiment can be provided instead of the mobile communication terminal 200.

Each of the mobile communication terminal 200 and the communication device 150 has a computer which is not illustrated. The computer includes an input means, an output means, a memory means, a central processing unit having arithmetic functions and a control means. For example, the mobile communication terminal 200 stores a communication control program in the memory means when it was produced. In addition, by using an input means such as a disk drive which is not illustrated, the communication device 150 stores the communication control program in the memory means from a storage medium which memorizes the communication control program. Further, timing and a method of acquisition of the communication control program are not limited to these descriptions. For example, after the communication system 300 was placed, the communication control program can be installed in each of the mobile communication terminal 200 and the communication device 150. Further, a communication function can be used instead of via the storage medium. Moreover, the communication control program can be embedded in the communication system 300 by a method other than storing in the memory means. For example, by attaching the ROM (Read Only Memory), in which the communication control program was written, to the mobile communication terminal 200 or the communication device 150, the communication control program can be embedded.

The communication control program is a program which makes a computer execute a process of connecting the communication device 150 with the mobile communication terminal 200 which operates as the access point. The communication control program is embedded such as in the communication device 150. Also, the communication control program can include a program of executing a display process of displaying the information concerning the communication state of the communication device 150 by the QR-code or the like.

Further, another communication control program is a program which makes a computer execute a readout process and a connection process. The readout process is a process which reads out the information concerning the communication state of the communication device 150. In addition, the connection process is a process which operates the mobile communication terminal 200 in the STA mode based on the readout information and connects with the access point 170, or a process which operates the mobile communication terminal 200 in the AP mode and connects the communication device 150 with the mobile communication terminal 200. Also, the communication control program is embedded such as in the mobile communication terminal 200.

While the above-mentioned communication control program is composed of two different communication control programs, it can merge the function of these two communication control programs and make it into single communication control program. At this time, the same communication control program is embedded into each of the mobile communication terminal 200 and the communication device 150. At this time, the mobile communication terminal 200 operates in accordance with the process following to a part of the control of the mobile communication terminal 200 of the program, and the communication device 150 operates in accordance with the process following to the part of the control of the communication device 150 of the program.

For the communication system 300 in which these kinds of programs were embedded, the readout process is executed by a computer of the mobile communication terminal 200. Before the readout process, the communication device 150 executes a process which forces the mobile communication terminal 200 to read out the information concerning the communication state of the local device. As it has been described in the first exemplary embodiment and the second exemplary embodiment, the process is such as a process in which the communication device 150 displays the information, or a process in which it stores the information in the wireless tag.

Then, the connection process is executed by a computer of the mobile communication terminal 200. By the process, the mobile communication terminal 200 operates in the STA mode or in the AP mode. When operating in the STA mode, the mobile communication terminal 200 connects with the access point 170. In addition, when operating in the AP mode, the mobile communication terminal 200 is connected from the communication device 150 which operates in the STA mode. In the communication device 150 which operates in the STA mode, by the computer in the communication device 150, the process of connecting the communication device 150 with the mobile communication terminal 200 is executed.

In the communication system 300 according to the present exemplary embodiment, the mobile communication terminal 200 reads out the information concerning the communication state of the communication device 150 which a user desires the connection, and operates in the STA mode or in the AP mode based on the readout information. As a result, in accordance with the state of the communication device 150, the user can easily connect the mobile communication terminal 200 with the communication device 150.

Also, the communication control program according to the present exemplary embodiment is not limited to the above-mentioned configuration.

For example, the above-mentioned information can include the information on indicating whether or not the communication device 150 connects with the access point 170. Further, when the communication device 150 connects with the access point 170, the above-mentioned information can include the setting value required for the connection to the access point 170. In addition, when the communication device 150 does not connect with the access point 170, the above-mentioned information can include the setting value required for the connection from the mobile communication terminal 200 to the communication device 150.

In addition, the above-mentioned information can include the information displayed on the communication device 150, or the information which can be read out by the mobile communication terminal 200 at a communication with the communication device 150.

In addition, when the communication device 150 connects with the access point 170, it can make a computer of the communication device 150 execute a collection update process which collects or updates the information concerning the communication state of the communication device 150 at the time when the connection is shut down. Alternatively, when the communication device 150 does not connect with the access point 170, it can make a computer of the communication device 150 execute the above-mentioned collection update process under the non-connected state.

Further, in the communication device 150, by a trigger of an activation of the application program which communicates the mobile communication terminal 200, it can also make a computer of the communication device 150 execute a second collection update process which collects or updates the information concerning the communication state of the communication device 150. An example that the communication device 150 makes a computer execute the second collection update process will be described in S451 and S452 in FIG. 12 of the after-mentioned fourth exemplary embodiment.

[Fourth Exemplary Embodiment]

Next, the fourth exemplary embodiment of the present invention will be described with reference to FIGS. 9 to 16.

Figure 9:
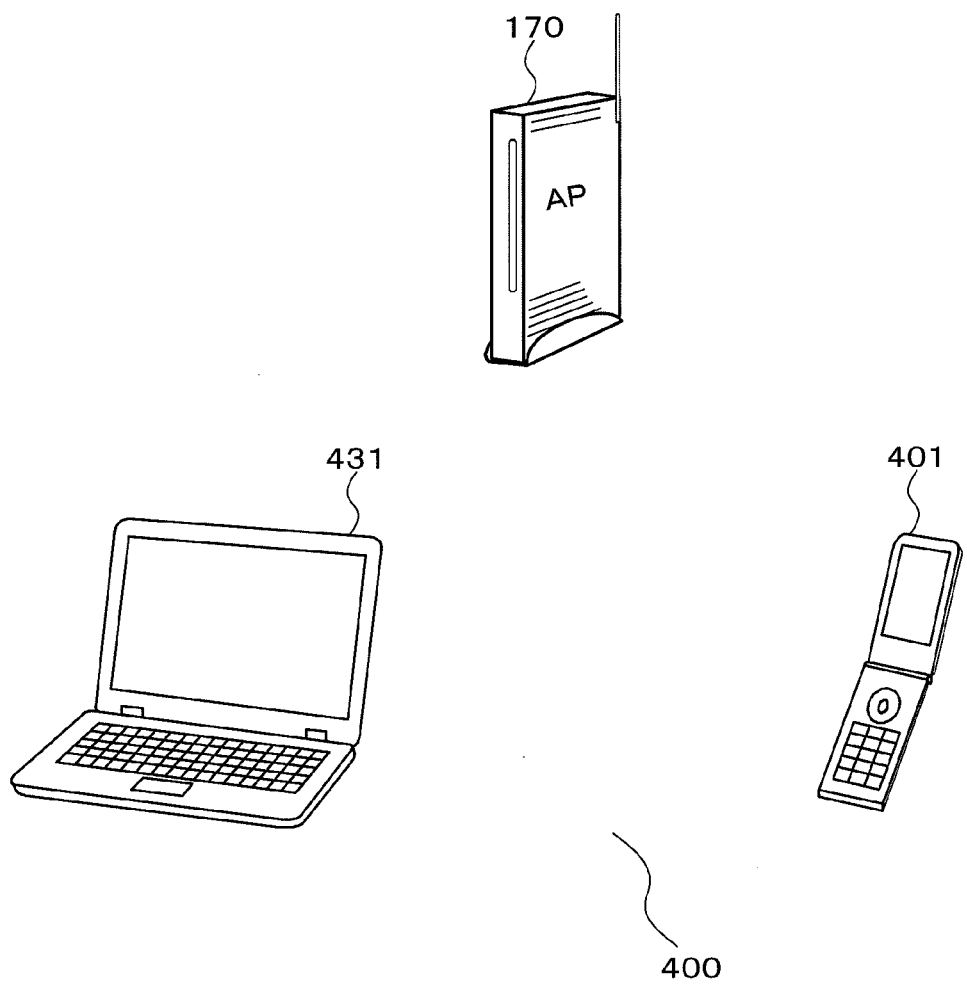
FIG. 9 shows an example of a configuration of the communication system according to the fourth exemplary embodiment of the present invention.
Figure 10:
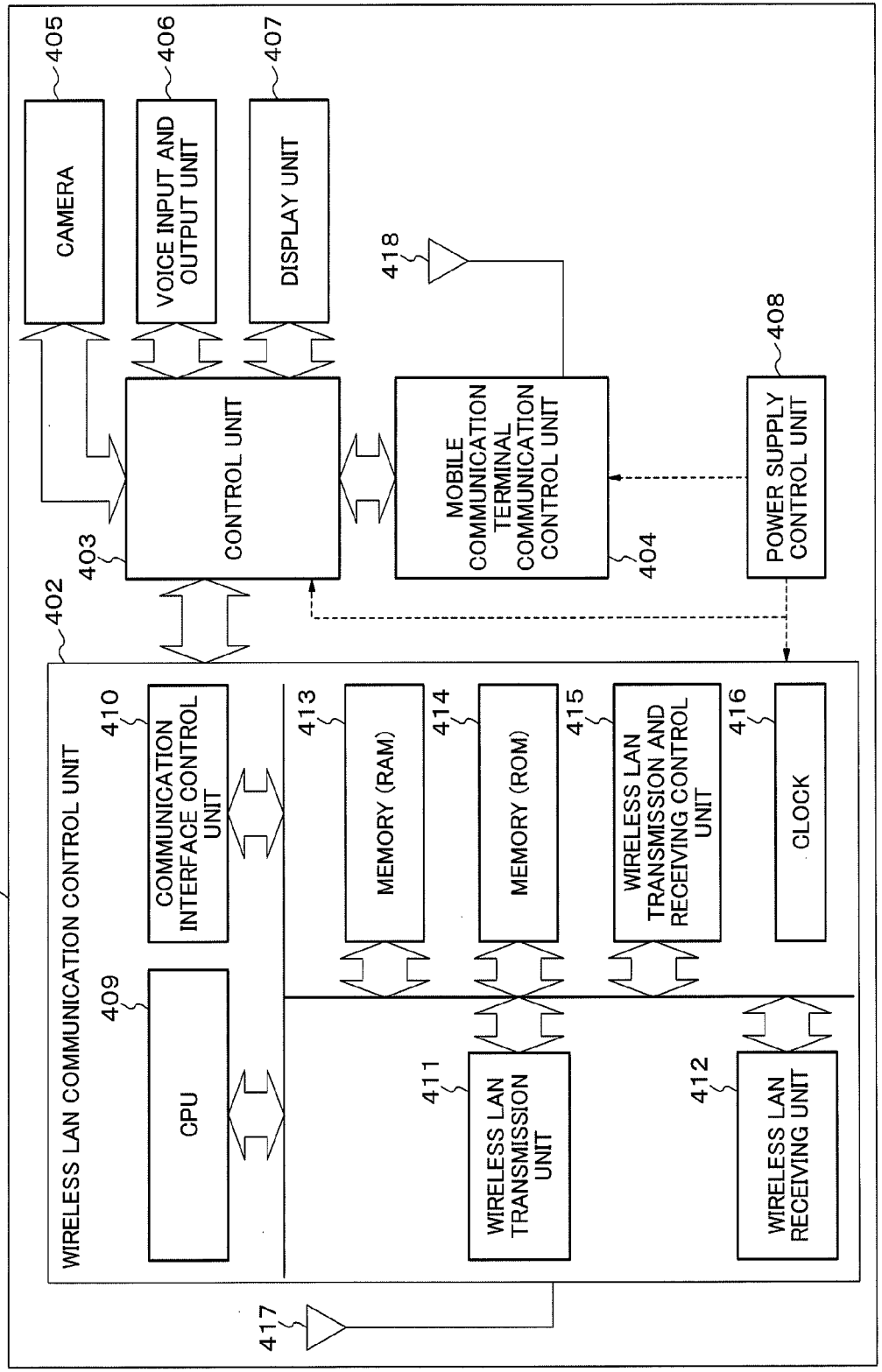
FIG. 10 shows an example of a configuration of the mobile communication terminal in the communication system according to the fourth exemplary embodiment of the present invention.
Figure 11:
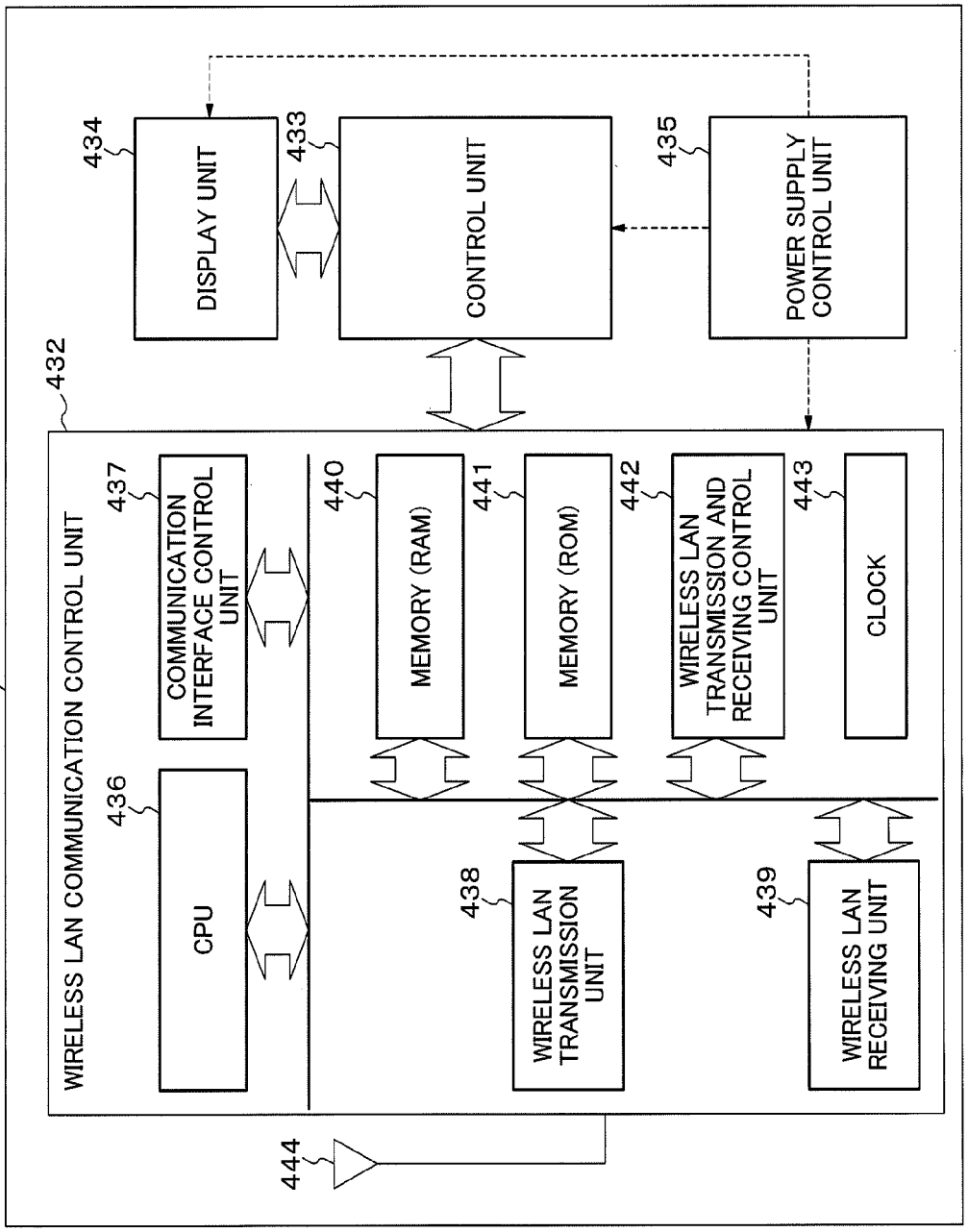
FIG. 11 shows an example of a configuration of the communication device in the communication system according to the fourth exemplary embodiment of the present invention.
Figure 12:
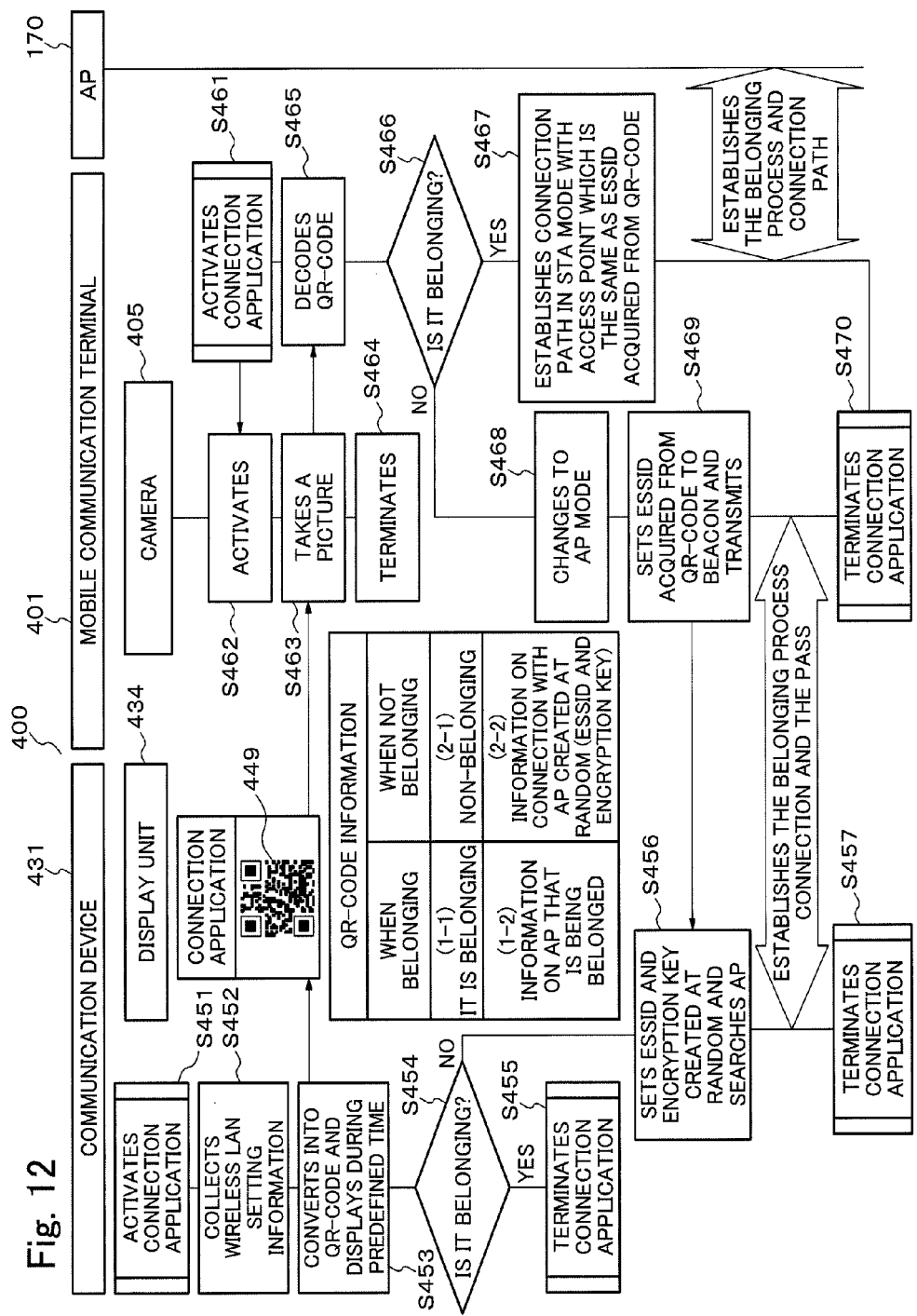
FIG. 12 is an explanatory drawing showing an example of an operation of the communication system according to the fourth exemplary embodiment of the present invention.
Figure 13:
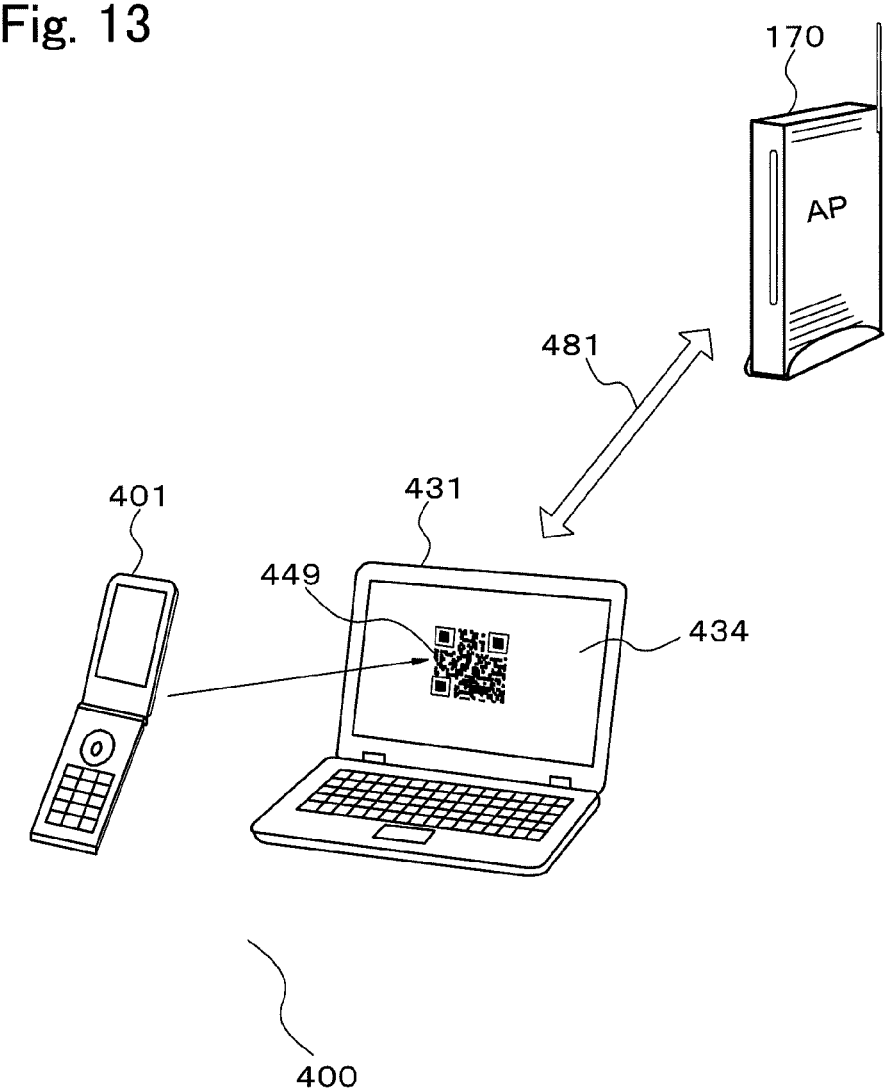
FIG. 13 is an explanatory drawing showing an example of a configuration in a state where the mobile communication terminal reads out information of the communication device in the communication system according to the fourth exemplary embodiment of the present invention.
Figure 14:
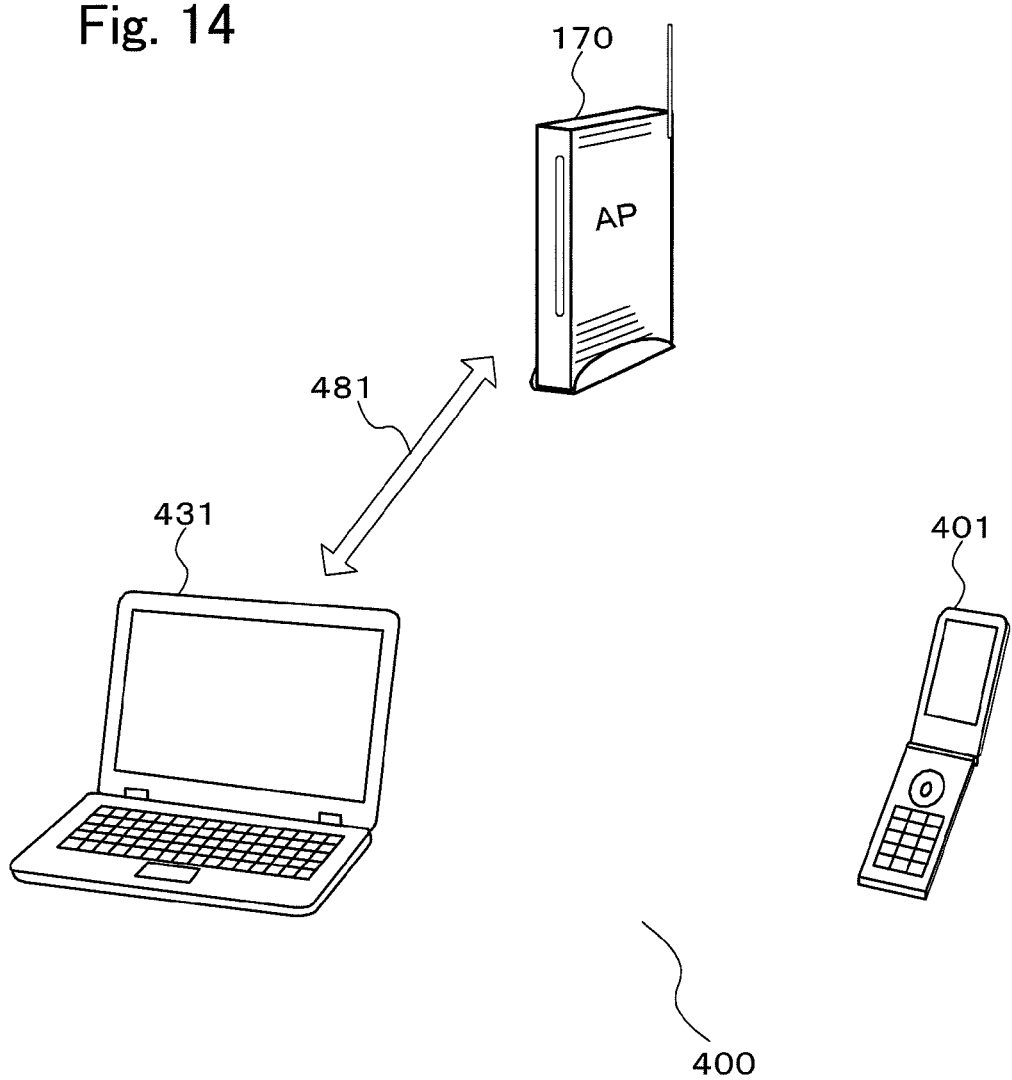
FIG. 14 is an explanatory drawing showing an example of a configuration in a state where the communication device connects with an access point in the communication system according to the fourth exemplary embodiment of the present invention.
Figure 15:
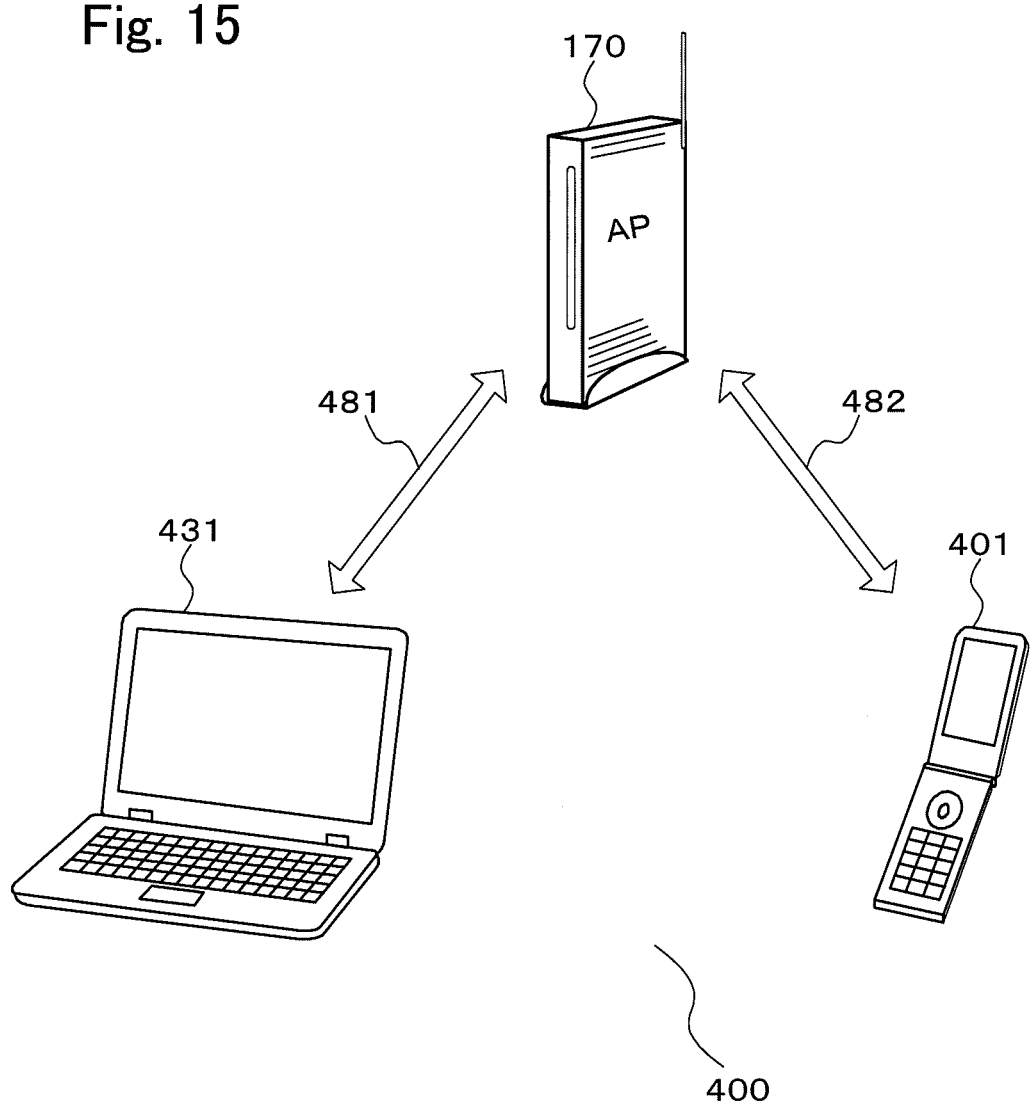
FIG. 15 is an explanatory drawing showing an example of a configuration in a state where the mobile communication terminal and the communication device are connected to the access point in the communication system according to the fourth exemplary embodiment of the present invention.
Figure 16:
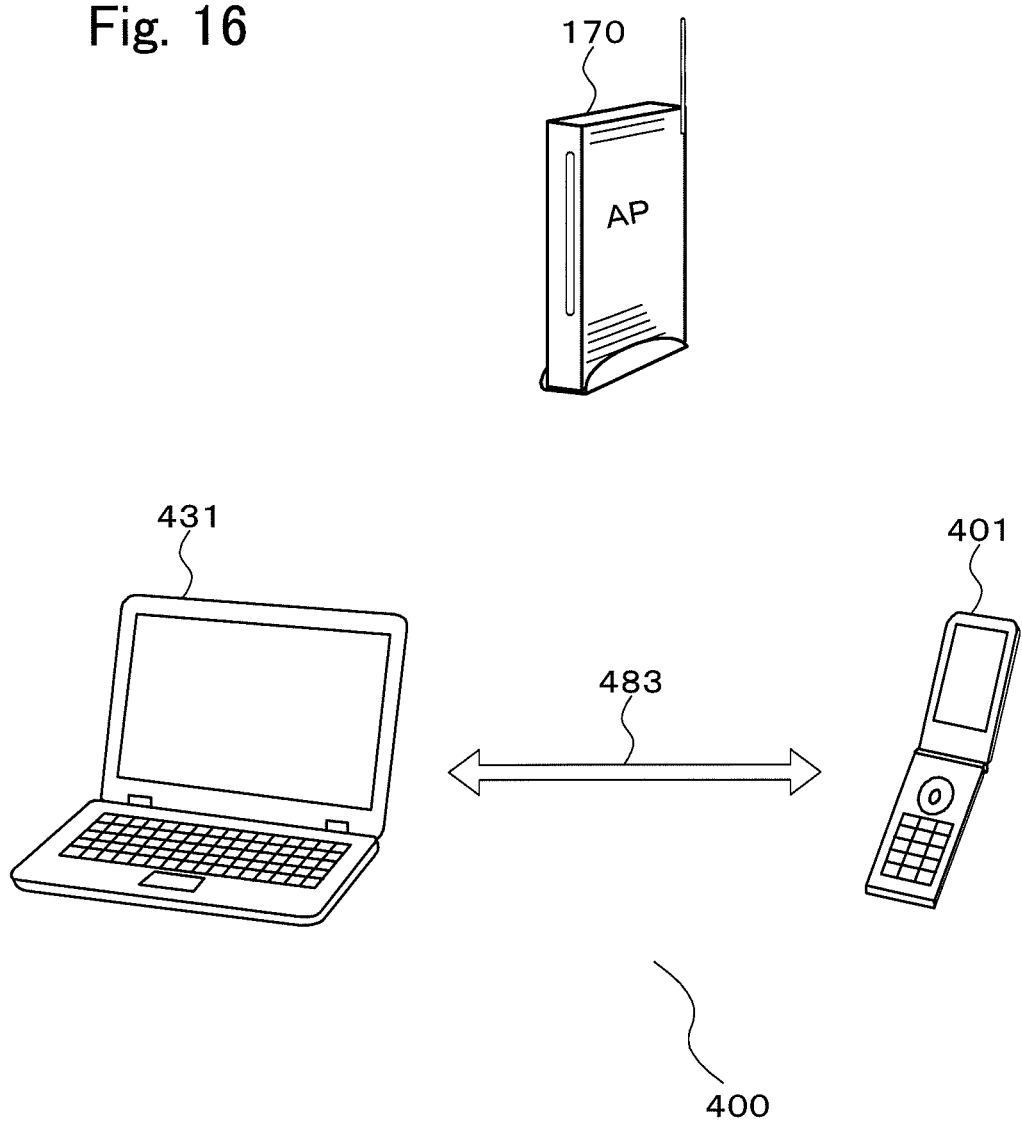
FIG. 16 is an explanatory drawing showing an example of a configuration in a state where the communication device is connected to the mobile communication terminal, which operates in an AP mode, in the communication system according to the fourth exemplary embodiment of the present invention.

FIG. 9 shows an example of the configuration of the communication system according to the fourth exemplary embodiment. FIG. 10 shows an example of the configuration of the mobile communication terminal in the communication system according to the fourth exemplary embodiment. FIG. 11 shows an example of the configuration of the communication device in the communication system according to the fourth exemplary embodiment. FIG. 12 shows an example of the operation of the communication system according to the fourth exemplary embodiment. FIG. 13 shows an example of a state that the mobile communication terminal reads out information on the communication device in the communication system according to the fourth exemplary embodiment. FIG. 14 shows an example of a state that the communication device connects with the access point in the communication system according to the fourth exemplary embodiment. FIG. 15 shows an example of a state that the mobile communication terminal and the communication device are connected to the access point in the communication system according to the fourth exemplary embodiment. FIG. 16 shows an example of a state that the mobile communication terminal operates at the AP mode and the communication device is connected to it in the communication system according to the fourth exemplary embodiment.

A communication system 400 shown in FIG. 9 includes a mobile communication terminal 401 and a communication device 431. The mobile communication terminal 401 and the communication device 431 respectively have the wireless LAN communication means for connecting with the access point 170. The access point 170 is connected with the network such as the Internet or an intranet which are not illustrated.

Even though the mobile communication terminal 401 shown in FIG. 10 is such as the mobile phone or a PHS (Personal Handy-phone System), according to the present exemplary embodiment, it is not limited to these if it includes a function to operate in the AP mode and STA mode. As the mobile communication terminal 401 or as a part of it, a laptop PC, a portable game machine, a PDA (Personal Digital Assistants) and an electronic still camera having the imaging means can be used. The mobile communication terminal 401 includes a wireless LAN communication control unit 402, a control unit 403, a mobile communication terminal communication control unit 404, a camera 405, a voice input and output unit 406, a display unit 407 and a power supply control unit 408.

The wireless LAN communication control unit 402 has a function of the wireless LAN communication means. The camera 405 which can take picture of a landscape and a portrait or the like is the readout means and is also used for the readout of a QR-code 449 (refer to FIG. 13) that is displayed as the example of the two dimensional code.

The wireless LAN communication control unit 402 includes a CPU (Central Processing Unit) 409, a communication interface control unit 410, a wireless LAN transmission unit 411, a wireless LAN receiving unit 412, a memory 413, a memory 414, a wireless LAN transmission and receiving control unit 415 and a clock 416. These units are connected via a bus. In addition, an antenna 417 is connected to the wireless LAN communication control unit 402. Moreover, an antenna 418 is connected to the mobile communication terminal communication control unit 404.

The memory 413 is the memory means (i.e. device) which can be read out and written, and such as RAM (Random Access Memory) or the like is used. The memory 414 is the memory means (device) for readout only, and such as ROM (Read Only Memory) or the like is used. In addition, such as the communication control program or the like can be stored in the memory 414. Moreover, the application program, which connects with the communication device 431 using the wireless LAN, can be stored in the memory 413 or in the memory 414. Moreover, the application program, which decodes the read out QR-code 449 and acquires the decoded information, can be stored in the memory 413 or the memory 414. Also, the above-mentioned description of the memory, which stores the above-mentioned program, is an example of the present exemplary embodiment. Accordingly, the storage location of it is not limited to the above-mentioned memory configurations. The above-mentioned program can be stored in one of the memory 413 or the memory 414, or it can be shared and stored in them.

The power supply control unit 408 supplies the power supply to each unit.

By the wireless LAN communication control unit 402, the mobile communication terminal 401 operates in the STA mode or in the AP mode following to the control of the control unit 403.

Further, a CPU 409, the control unit 403, an input means and an output means (e.g. the antennas 417, 418 and the voice input and output unit 406) can be composed of a part of a computer which is not illustrated.

FIG. 11 shows an example of the communication device 431 according to the embodiment.

The communication device 431 shown in FIG. 11 is such as a portable laptop computer. In addition, the communication device 431 can be such as a game machine having the wireless LAN communication means, an electronic still camera, a PDA or a mobile communication terminal including the mobile phone and the PHS.

The communication device 431 includes a wireless LAN communication control unit 432, a control unit 433, a display unit 434 and a power supply control unit 435.

The wireless LAN communication control unit 432 communicates with the mobile communication terminal 401 via the wireless LAN. The control unit 433 controls each part in the communication device 431. The display unit 434 displays characters and various figures. Further, such as the liquid crystal display device can be used for the display unit 434. Moreover, the QR-code 449 is displayed on the display unit 434 (refer to FIG. 13). The power supply control unit 435 controls the supply of the electric power to each part.

The wireless LAN communication control unit 432 includes a CPU 436, a communication interface control unit 437, a wireless LAN transmission unit 438, a wireless LAN receiving unit 439, a memory 440 and a memory 441. Further, the wireless LAN communication control unit 432 includes a wireless LAN transmission and receiving control unit 442 and a clock 443. In addition, the wireless LAN communication control unit 432 includes an antenna 444 for the wireless LAN communication.

The CPU 436 controls each part in the wireless LAN communication control unit 432. The wireless LAN transmission unit 438 communicates with the mobile communication terminal 401 via the wireless LAN. The wireless LAN receiving unit 439 receives a signal from the antenna 444. The memory 440 is a readable and writable memory means and the RAM is used. The memory 441 is a readout only memory means, and the ROM is used. Further, the memory 441 stores the communication control program or the like. Furthermore, the memory 440 stores the control program of the communication device.

For example, when the communication control program is installed at the time of the production, it can be stored in the memory 441. Further, when the communication control program is installed from the storage medium using the input means such as the disk drive which is not illustrated, it can be stored in the memory 440. Furthermore, a display program, which creates the QR-code 449 based on the state of the communication device 431 and displays the QR-code during a predetermined time, can be stored such as in the memory 440 or in the memory 441.

Also, the above-mentioned descriptions of the memory which stores the above-mentioned program are examples of the present exemplary embodiment. Accordingly, the storage location of it is not limited to the above-mentioned memory configurations. The above-mentioned program can be stored in one of the memory 440 or the memory 441, or it can be divided and stored in them.

The wireless LAN transmission and receiving control unit 442 controls the transmission and reception of the wireless LAN communications. The clock 443 creates a clock frequency for synchronization of processes among the units. The communication interface control unit 437 controls for the communication interface.

Also, the CPU 436, the control unit 433, the input means and the output means (i.e. the antenna 444 and the display unit 434 or the like) can compose a part of the computer which is not illustrated.

A method of embedding the communication control program in the mobile communication terminal 401 and the communication device 431 is not limited to the above-mentioned method of installing at the time of the production or the method of installing from the storage medium. In the communication system according to the fourth exemplary embodiment, similar to the third exemplary embodiment, the communication control program can be embedded through an installation using a communication function or an insertion of a ROM in which the program for communication controls is stored.

The operation of the communication system 400 according to the present exemplary embodiment will be described with reference to FIG. 12.

When the wireless LAN connection application of the communication device 431 is activated by a user's instruction (S451), the control unit 433 collects the wireless LAN setting information (S452). The collected information is converted into the QR-code 449, and is displayed on the display unit 434 for a predetermined time (S453).

The control unit 433 judges whether or not it belongs (i.e. under a connection) to the access point 170 (S454), and terminates the connection application (S455) if it belongs (Yes in S454).

When the communication device 431 connects with the access point 170, that is, when it belongs (Yes in S454), the information of the QR-code 449 includes two pieces of information comprising: (1-1) information that it is belonging; and (1-2) information on the access point 170, to which it belongs (e.g. an ESSID, a kind of cipher systems and a encryption key (it can be called "encryption key")). The information on the access point 170 is a setting value required for the connection with the access point 170, and is the ESSID for connecting with the access point 170, the kind of used cipher systems and the encryption key or the like. The cipher systems include such as no-security, WEP (Wired Equivalent Privacy), WPA (Wi-Fi Protected Access), WPA-TKIP (Temporal Key Integrity Protocol), WPA-PSK (Pre Shared-Key), WPA2-PSK and 802.1X TTLS (Tunneled Transport Layer Security) which requires an authentication server or the like.

When the communication device 431 does not connect with the access point 170, that is, when it is not belonging (No in S454), the information on the QR-code 449 includes two pieces of information comprising: (2-1) information that it is not belonging; and (2-2) information on the connection with the access point and is created at random (e.g. ESSID, the kind of cipher systems and the encryption key). At this time, in order to enhance the security, the created ESSID and the encryption key can be further encrypted.

In addition, in the mobile communication terminal 401, when the wireless LAN connection application is activated by a user's instruction (S461), the control unit 403 activates the camera 405. When the user takes a picture of the QR-code 449 with the camera 405 (refer to S463 and FIG. 10), the control unit 403 decodes the QR-code 449 (S465). By the decoding, one of the pieces of information, which are included in the QR-code 449, among the above-mentioned information of (1-1) and (1-2) or information of (2-1) and (2-2) can be obtained. The control unit 403 judges whether or not the communication device 431 is belonging to the access point 170 based on the obtained information (S466).

When the communication device 431 is belonging to the access point 170 (i.e. in case of Yes in S466, refer to FIG. 14), a connection path 481 between the communication device 431 and the access point 170 has been established, and the control unit 403 establishes a connection path 482 in the STA mode to the access points 170 to be connected using the ESSID acquired from the QR-code 449 (refer to S467 and FIG. 15). That is, by the connection with the access point 170 via the wireless LAN, the mobile communication terminal 401 can communicate with the communication device 431.

In addition, when the communication device 431 is not belonging to the access point 170 (i.e. in case of No in S466), the control unit 403 changes the communication mode to the AP mode (S468). The control unit 403 sets the ESSID acquired from the QR-code 449 to a beacon, and transmits it to the communication device 431 (S469).

When the control unit 433 of the communication device 431 receives the beacon from the mobile communication terminal 401, it searches an access point based on the setting value (i.e. ESSID created at random and the encryption key) which was converted into the QR-code 449 and displayed (S456). At that time, the mobile communication terminal 401 will be the access point of the communication device 431.

Then, the belonging process is executed between the communication device 431 and the mobile communication terminal 401, and a connection path 483 will be established (refer to FIG. 16). At that time, because the encryption key is already exchanged, the data communication is possible.

When the connection path 483 will be established, the wireless LAN connection application of the communication device 431 will be terminated (S457), and the wireless LAN connection application of the mobile communication terminal 401 (S470) will be also terminated.

According to the present exemplary embodiment, the mobile communication terminal 401 reads out the information concerning the communication state of the communication device 431 which a user desires to connect, and operates in the STA mode or in the AP mode based on the information and connects with the communication device 431. Therefore, according to the present exemplary embodiment, the state of the connection is selected in accordance with the state of the communication device 431.

According to the present exemplary embodiment, it is not necessary for a user to check the connection topology or a setting work of the connection. For this reason, without any complicated works, a user can easily connect between the devices (i.e. connection of the mobile communication terminal 401 and the communication device 431).

Also, in the present exemplary embodiment, the setting value required for the connection from the mobile communication terminal 401 to the access point 170 and the setting value required for the connection from the mobile communication terminal 401 to the communication device 431 include a kind of cipher system. However, the present invention is not limited to the present exemplary embodiment. That is, when there is no anxiety about security, at least one of the setting value required for the connection from the mobile communication terminal 401 to the access point 170 and the setting value required for the connection from the mobile communication terminal 401 to the communication device 431 does not have to include the kind of cipher systems and the encryption key.

In addition, according to the present exemplary embodiment, the communication device 431 collects the information (i.e. the above-mentioned (1-1) or (2-1)) on whether or not it connects with the access point 170 and the related information ((1-2) or (2-2)), at the moment when the user activated the connection application. The present invention is not limited to the present exemplary embodiment. That is, when the communication device 431 communicates with the mobile communication terminal 401, it can collect the information on the above-mentioned (1-1) or (2-1) and (1-2) or (2-2). For example, without the user's instruction, the communication application of the communication device 431 can communicate in accordance with the predetermined schedule or communicate at a moment based on the predetermined condition.

[Fifth Exemplary Embodiment]

Next, the fifth exemplary embodiment of the present invention will be described with reference to FIG. 17.

Figure 17:
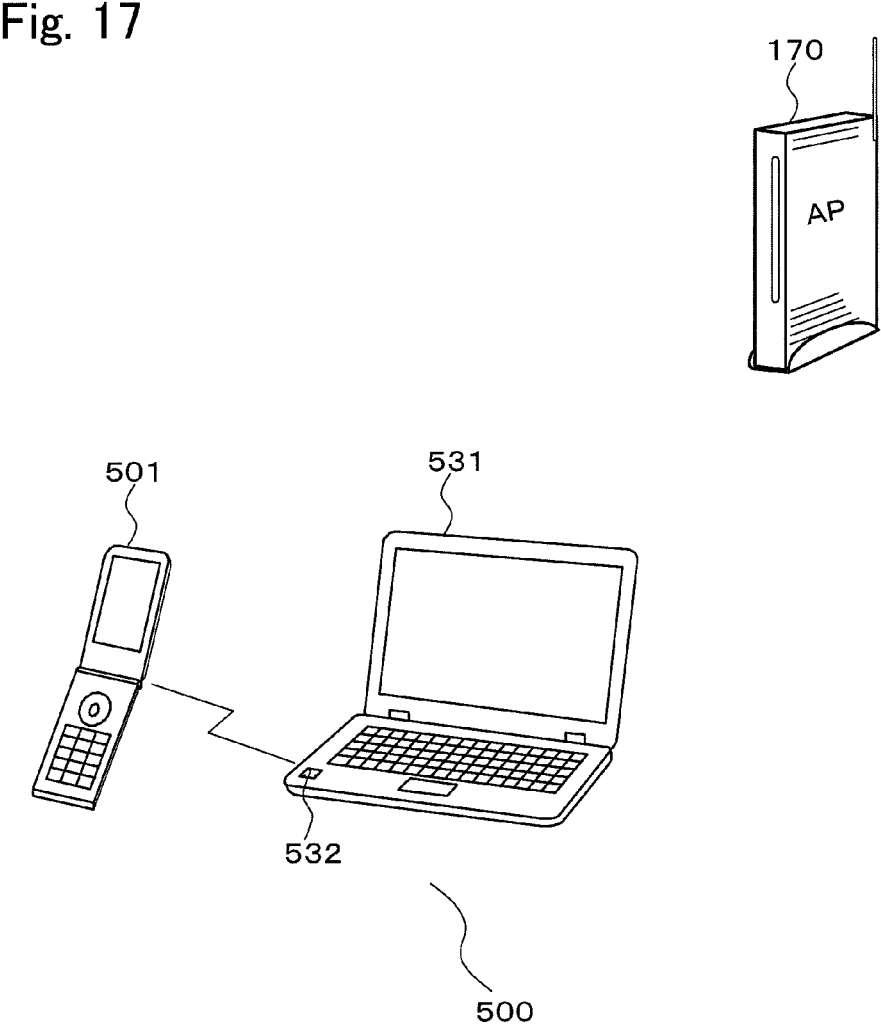
FIG. 17 is an explanatory drawing showing an example of a configuration in a state where the mobile communication terminal reads out information on the communication device in the communication system according to the fifth exemplary embodiment of the present invention.

In the communication system according to the fifth exemplary embodiment, FIG. 17 shows an example of the configuration where the mobile communication terminal reads out the information in the communication device.

In the communication system 400 according to the fourth exemplary embodiment, the communication device 431 displays the QR-code 449, and the mobile communication terminal 401 read the QR-code 449. In contrast, in a communication system 500 according to the fifth exemplary embodiment, a mobile communication terminal 501 reads out the information stored in a RFID tag 532 of a communication device 531 by the readout means which is not illustrated. Also, in the communication system 500 according to the fifth exemplary embodiment, similar to the communication system 400 according to the fourth exemplary embodiment, when the wireless LAN connection application is activated (S451 in FIG. 12), then the connection operation is activated.

The communication system 500 according to the fifth exemplary embodiment includes the mobile communication terminal 501 and the communication device 531.

The communication device 531 includes the RFID tag 532. The RFID tag 532 stores the information on (1-1) and (1-2) or the (2-1) and (2-2) which are described in the fourth exemplary embodiment.

The mobile communication terminal 501 includes a reader, which is not illustrated, for readout the information stored in the RFID tag 532.

In the communication system 500 according to the present exemplary embodiment, one of the above-mentioned information (1-1) and (1-2) or (2-1) and (2-2) are stored in the RFID tag 532 of the communication device 531. As shown in FIG. 17, the user brings the mobile communication terminal 501 close to the communication device 531 and reads out the information stored in the RFID tag 532 by the reader of the mobile communication terminal 501. The mobile communication terminal 501 operates in the STA mode or in the AP mode based on the readout information and connects with the communication device 531. According to the present exemplary embodiment, the mobile communication terminal 501 connects with the communication device 531 in a state in accordance with the state of the communication device 531.

In the fifth exemplary embodiment and in the fourth exemplary embodiment, the connection operation starts when a user activates the wireless LAN connection application (S451 in FIG. 12). That is, it needs the user's operation to activate the wireless LAN connection application. For this reason, there is a problem that it causes a trouble for the connection process between the mobile communication terminal 501 and the communication device 531.

In order to settle the problem, it may be configured so that the wireless LAN connection application can be activated at the moment when the reader of the mobile communication terminal 501 communicates with the RFID tag 532 of the communication device 531. In this case, at the moment when the user brought the mobile communication terminal 501 close to the communication device 531 and the mobile communication terminal 501 communicates with the communication device 531, the wireless LAN connection application will be activated. The communication device 531 collects the wireless LAN setting information and stores the collected information in the RFID tag 532. Next, the reader of the mobile communication terminal 501 reads out the stored information from the RFID tag 532. Because the subsequent processes are identical with the processes in the fourth exemplary embodiment, descriptions will be omitted.

In this way, in the communication system 500 according to the present exemplary embodiment, the wireless LAN connection application is activated at the moment when the reader of the mobile communication terminal 501 communicates with the RFID tag 532 of the communication device 531. As a result, the connection process between the mobile communication terminal 501 and the communication device 531 can be simplified.

Further, in the above-mentioned configuration, the reader of the mobile communication terminal 501 read out the stored information from the RFID tag 532. However, the present invention is not limited to the described readout method, and the information readable by the mobile communication terminal 501 can be transmitted by the two dimensional code or other code, described in the fourth exemplary embodiment, or the passphrase or the like, to be described in the sixth exemplary embodiment.

[Sixth Exemplary Embodiment]

Next, the sixth exemplary embodiment of the present invention will be described with reference to FIG. 18.

Figure 18:
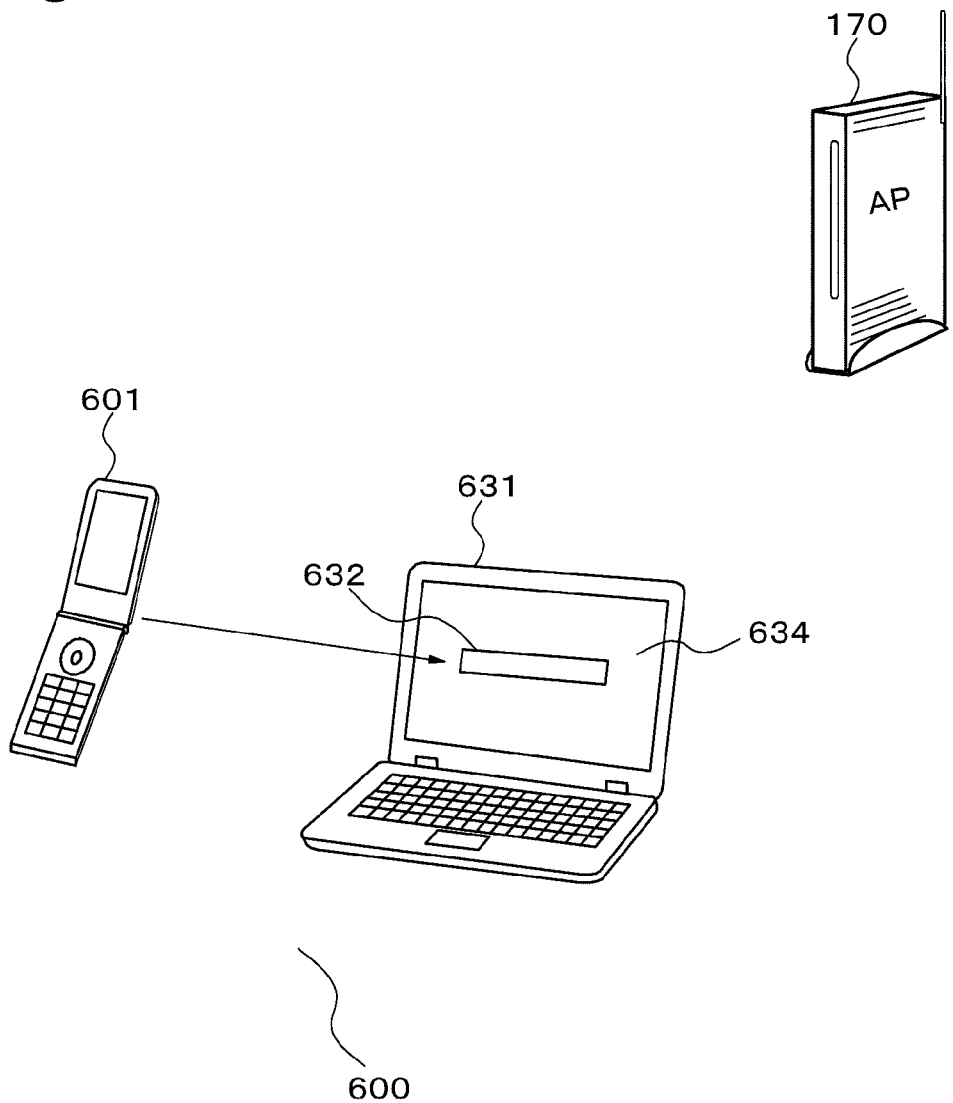
FIG. 18 is an explanatory drawing showing an example of a configuration in a state where the mobile communication terminal reads out information on the communication device in the communication system according to the sixth exemplary embodiment of the present invention.

FIG. 18 is the explanatory drawing showing an example of the configuration where the mobile communication terminal reads out information on the communication device in the communication system according to the sixth exemplary embodiment.

In the communication system 400 according to the fourth exemplary embodiment, the communication device 431 displays the QR-code 449 as an example of the two dimensional code, and the mobile communication terminal 401 read out the QR-code 449. In contrast, in a communication system 600 according to the sixth exemplary embodiment, a communication device 631 displays a passphrase 632, and a mobile communication terminal 601 reads out the passphrase 632.

The communication system 600 according to the sixth exemplary embodiment includes the mobile communication terminal 601 and the communication device 631.

The communication device 631 has a display means 634 as an information provision means. The display means 634 displays the passphrase 632 created based on the information (1-1) and (1-2) or the information (2-1) and (2-2) described in the fourth exemplary embodiment. While the passphrase 632 is an integer of eight digits as an example, the character string of number of figures other than eight digits can also be used.

In addition, the mobile communication terminal 601 includes a camera, which is not illustrated, for reading out the passphrase 632 and decodes the readout passphrase 632 and acquires the information concerning the communication state of the communication device 631 from the readout information. That is, the mobile communication terminal 601 decodes the passphrase 632 following to a procedure corresponding to a creation procedure of the passphrase 632 and acquires the information concerning the communication state of the communication device 631 from the passphrase 632.

In the case of the QR-code described in the fourth exemplary embodiment, the setting value required for the connection may leak when a third party reads the QR-code. For this reason, in the fourth exemplary embodiment, after a predetermined time has passed, the display of the QR-code is terminated so that the QR-code is not read out by a malicious third party.

In contrast, the passphrase in the present exemplary embodiment is created following a confidential procedure based on the setting value required for the connection, and the setting value itself required for the connection is not displayed. For this reason, even if the passphrase is read out by a third party, there is no possibility that the setting value may leak.

In the communication system according to the present exemplary embodiment, the passphrase is simpler in structure than other code such as the QR-code or the like. For this reason, recognition is simplified and a quick setting is enabled. Further, even if the passphrase is read out by a third party, the possibility of information leak can be minimized.

[Seventh Exemplary Embodiment]

Next, the seventh exemplary embodiment of the present invention will be described with reference to FIG. 19.

Figure 19:
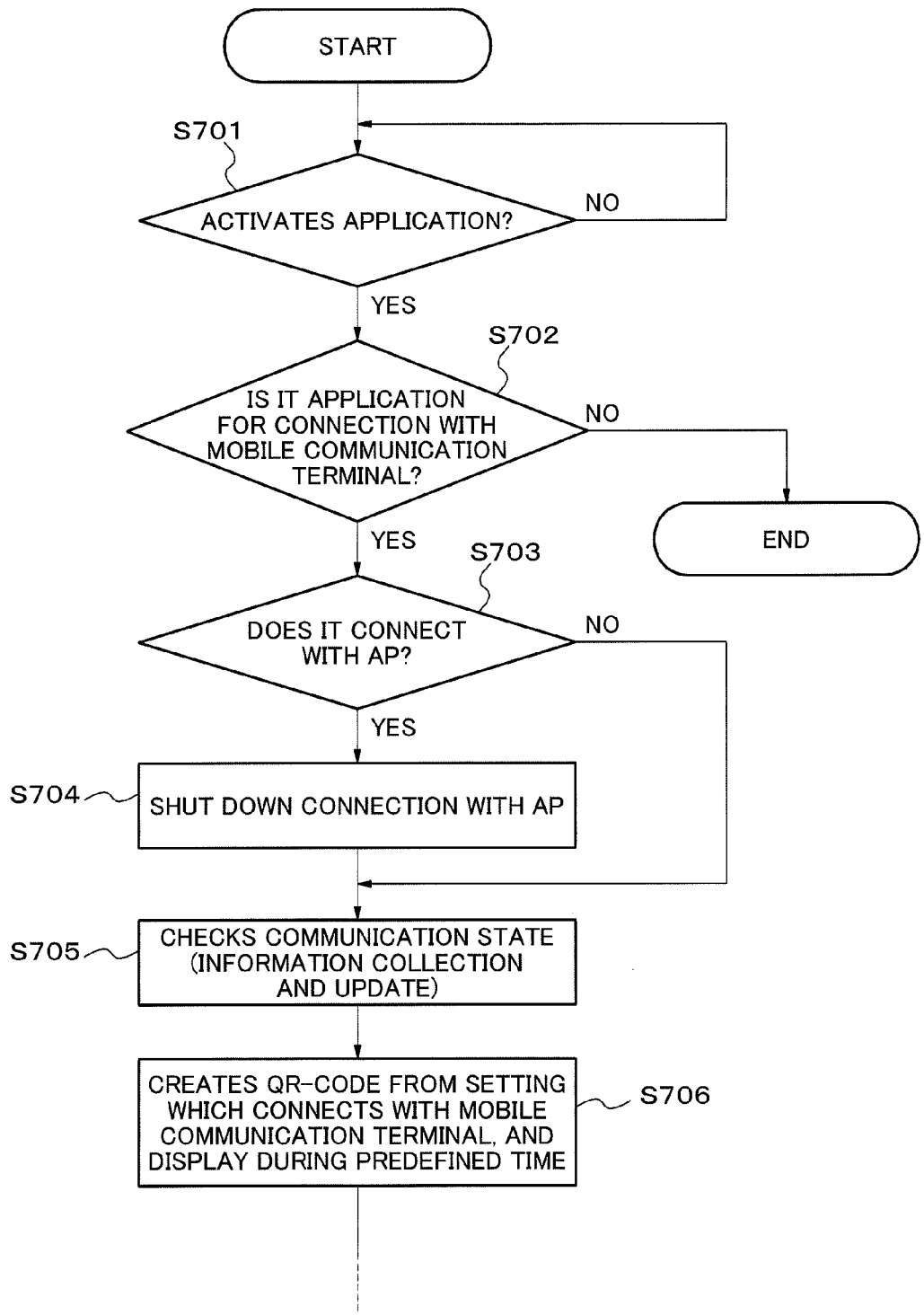
FIG. 19 is a flowchart showing an example of an operation in which the communication device creates and displays the QR-code in the communication system according to the seventh exemplary embodiment of the present invention.

FIG. 19 is the flowchart showing the example of process in which the communication device creates and displays the QR-code in the communication system according to the seventh exemplary embodiment.

According to the second to sixth exemplary embodiment, the mobile communication terminal is operating in the STA mode or in the AP mode in accordance with the state of the communication device, and is connecting with the communication device via the access point or is directly connected from the communication device without intermediation of the access point.

In contrast, in the present exemplary embodiment, it is judged whether or not the communication device connects with the access point. When the communication device connects with the access point, the information concerning the communication state of the communication device will be collected or updated at the moment when the connection is shut down. When the communication device does not connect with the access point, the information concerning the communication state of the communication device is collected or updated under a state where it is not connected.

In addition, in the second to the sixth exemplary embodiment, the communication device collects or updates the information which the mobile communication terminal reads out at the moment when a user activates the wireless LAN connection application. That is, a user has to intentionally activate the wireless LAN connection application of the communication device in order to connect the communication device with the mobile communication terminal.

In contrast, according to the present exemplary embodiment, it is judged whether or not the application, which has been activated in the communication device, is the application by which the communication device communicates with the mobile communication terminal. Then, at the timing of the judgment, the communication device automatically checks (i.e. collects or updates) the above-mentioned information which the mobile communication terminal reads out, and further creates the QR-code based on the information and displays it. Also, as is described in the second exemplary embodiment, instead of the QR-code, a two dimensional code different from the QR-code, a one-dimensional code or a passphrase or the like can be generated. In addition, instead of displaying the QR-code, the transmitted information can be stored in the wireless tag such as the RFID tag which was prepared in advance.

In the present exemplary embodiment, an example of a process where the communication device creates the QR-code and displays it will be described with reference to FIG. 19.

The control means of the communication device judges whether or not the application has been activated (S701). When the application has been activated (Yes in S701), the control means judges whether or not the application is an application which communicates with the mobile communication terminal (S702). The application which communicates with the mobile communication terminal includes such as software which backs up data (e.g. picture, telephone book, address book and schedule chart or the like) of the mobile communication terminal to the communication device. In addition, the application can be an application which transmits the data, which is backed up or saved in the communication device, to the mobile communication terminal.

When the application is not an application which communicates with the mobile communication terminal (No in S702), the control means terminates the process without creating and displaying the QR-code.

When the application is an application which communicates with the mobile communication terminal (Yes in S702), the process proceeds to S703.

The communication device according to the present exemplary embodiment has only STA mode. For this reason, the connection state of the communication device has two states including a state of connecting with the access point and a state of not connecting with the access point.

At first, the control means judges whether or not the communication device is connected with the access point (S703).

When it is judged that the communication device is connected with the access point (Yes in S703), the control means compulsorily shuts down the connection to the access point (S704) and the process moves to S705. When it is judged that the communication device is not connected with the access point (No in S703), the process moves to S705. Then, the control means of the communication device checks the connection state of the local device (i.e. communication device) (S705). The check is equivalent to the collection of the information concerning the communication state of the communication device. When the stored information is judged to be old, the information is updated.

Further, the control means converts the setting value required for the mobile communication terminal to operate in the AP mode into the QR-code, and displays the QR-code on the display means during a predetermined time (S706). When the QR-code is displayed, by a user's operation, the mobile communication terminal reads out the QR-code. Because the subsequent operations of the mobile communication terminal are identical to the operations in the above-mentioned exemplary embodiment, the descriptions will be omitted.

According to the present exemplary embodiment, because the connection is compulsorily shut down in the case that the communication device connects with the access point, the mobile communication terminal always operates in the AP mode, and the communication device is always connected to the mobile communication terminal. As a result, the connection of the mobile communication terminal and the communication device is always a direct connection. This connection is an advantageous connection in the points such as a communication speed, security and a topology form compared with the connection via the access point.

In addition, according to the present exemplary embodiment, it is judged whether or not the activated application is an application by which the communication device communicates with the mobile communication terminal. For this reason, when an application by which the communication device communicates with the mobile communication terminal is activated, the information concerning the communication state of the communication device is collected and updated. As a result, when an application by which the communication device communicates with the mobile communication terminal is activated, the collection and the update of the information concerning the communication state of the communication device are automatically executed.

[Eighth Exemplary Embodiment]

Next, the eighth exemplary embodiment of the present invention will be described with reference to FIG. 20.

Figure 20:
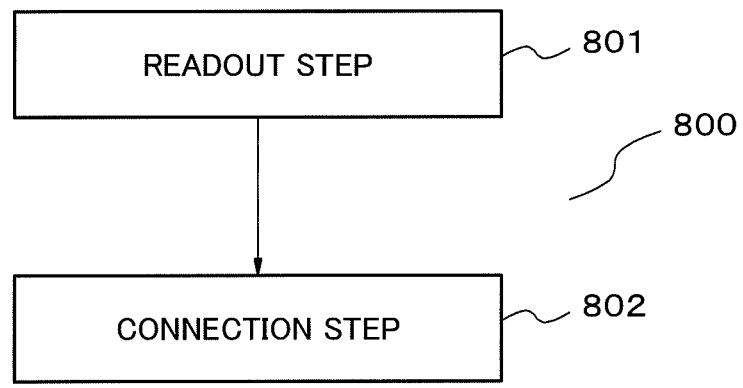
FIG. 20 is an explanatory drawing showing an example of an operation of the communication control method according to the eighth exemplary embodiment of the present invention.

FIG. 20 is the explanatory drawing showing an example of process of the communication control method in the communication system according to the eighth exemplary embodiment.

A communication control method 800 according to the present exemplary embodiment includes a readout step 801 and a connection step 802. The readout step 801 is a step which reads out the information concerning the communication state of the communication device.

The connection step 802 is a step which makes the mobile communication terminal operate in the STA mode and connects it with the access point with which the communication device is connected, or makes the mobile communication terminal operate in the AP mode and connects the communication device with the mobile communication terminal based on the readout information. Also, the readout step 801 and the connection step 802 are executed such as in the mobile communication terminal.

Following to the communication control method 800 according to the present exemplary embodiment, the mobile communication terminal operates in the STA mode or in the AP mode based on the information which was read out by the readout means which can read out the information concerning the communication state of other communication device. For this reason, in accordance with the state of the communication device, a user can easily connect the mobile communication terminal with the communication device.

Also, in the above-mentioned communication control method 800, the above-mentioned information can include the information on whether or not the communication device connects with the access point. Further, when the communication device connects with the access point, the above-mentioned information can include the setting value required for the connection with the access point in the case that the communication device connects with the access point, or the setting value required for the connection from the mobile communication terminal to the communication device in the case that the communication device does not connect with the access point.

In addition, the above-mentioned information can be displayed on the communication device, or can be the information that the mobile communication terminal can read out through a communication with the communication device.

In addition, when the communication device connects with the access point, it can have a collection update step which collects or updates the information concerning the communication state of the communication device when the connection will be shut down. Alternatively, when the communication device does not connect with the access point, it can have the collection update step which collects or updates the above-mentioned information under the state of not-connecting.

In addition, communication device can further has a second collection update step by which the communication device collects or updates the information concerning the communication state of the communication device, based on an activation of the application which communicates with the mobile communication terminal. Also, the above-mentioned collection update step and the second collection update step are executed in such as the communication device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

While the communication system according to the present exemplary embodiment includes the communication device and the mobile communication terminal, the invention of the present application is not limited to the above-mentioned embodiments. That is, the communication terminal can be a PC or a large computer such as a workstation which are statically installed and are operated by a user.

In addition, while the communication device and the communication terminal communicate via the wireless communication following to the communication system according to the present exemplary embodiment, the present invention is not limited to the case. That is, the communication with the access point can be done by using a public line such as an optical communication, and also the communication between the communication device and the communication terminal can be done by installing a communication line. Further, a user can install a wired communication line on each communication, or it can change the communication method while installing.

This application is based upon and claims the benefit of priority from Japanese patent application No. 2010-095834, filed on Apr. 19, 2010, the disclosure of which is incorporated herein in its entirety by reference.

Industrial Applicability

The present invention can be applied to a mobile communication terminal equipped with a STA mode and an AP mode. In addition, in particular, the present invention can further be applied to a mobile communication terminal equipped with a camera for reading displayed information and a reader which reads out information stored in the wireless tag.

REFERENCE SINGS LIST 100 mobile communication terminal
101 wireless LAN communication means
102 readout means
150 communication device
151 wireless LAN communication means
152 display means
153 information collection means
154 information conversion means
155 control means
170 access point
180 internet
200 mobile communication terminal
201 camera
202 control means
203 two dimensional code
300 communication system
400 communication system
401 mobile communication terminal
402 wireless LAN communication control unit
403 control unit
404 mobile communication terminal communication control unit
405 camera
406 voice input and output unit
407 display unit
408 power supply control unit
409 CPU
410 communication interface control unit
411 wireless LAN transmission unit
412 wireless LAN receiving unit
413 memory
414 memory
415 wireless LAN transmission and receiving control unit
416 clock
417 antenna
418 antenna
431 communication device 432 wireless LAN communication control unit
433 control unit
434 display unit
435 power supply control unit
436 CPU
437 communication interface control unit
438 wireless LAN transmission unit
439 wireless LAN receiving unit
440 memory
441 memory
442 wireless LAN transmission and receiving control unit
443 clock
444 antenna
449 QR-code
481 connection path
482 connection path
483 connection path
500 communication system
501 mobile communication terminal
531 communication device
532 RFID tag
600 communication system
601 mobile communication terminal
631 communication device
632 passphrase
634 display means
800 communication control method
801 readout step
802 connection step

The invention claimed is:

1. A communication system, comprising:
a communication device; and
a communication terminal which communicates with said communication device, and comprises:
an information acquisition unit that acquires information on a communication state of said communication device, said information being provided by an information provision unit of said communication device; and
a wireless LAN communication unit that operates either in a station (STA) mode for connecting with an access point or in an AP mode for operating as said access point based on said acquired information,
said communication terminal connecting with said access point in the case that said communication terminal operates in said STA mode, and said communication device connecting with said communication terminal in the case that said communication terminal operates in said AP mode,
wherein said information includes a first setting value required for said communication terminal to connect with said access point when said communication device connects with said access point, or a second setting value required for said communication device to connect with said communication terminal when said communication device does not connect with said access point.

2. The communication system according to claim 1, wherein
said information further includes information on whether or not said communication device connects with said access point.

3. The mobile communication terminal according to claim 1, wherein
said information is either display information which is displayed on said information provision unit or readout information which is transmitted from said information provision unit to said information acquisition unit.

4. The communication system according to claim 3, wherein
said information is either the display information converted into a one dimensional code or a two dimensional code and displayed on said information provision unit, or the readout information which is stored in a wireless tag and is read out by said information acquisition unit.

5. The communication system according to claim 3, wherein
said information is the display information coded to a passphrase or a display pattern, and displayed on said information provision unit,
said display pattern includes a movement or a blink of a cursor or a mouse pointer, or a movement or a blink of a symbol or a figure, and
said information acquisition unit decodes said display information and acquires the information concerning the communication state of said communication device.

6. The communication system according to claim 2, wherein
said first setting value which is required for said communication terminal to connect with said access point includes an ESSID (Extended Service Set Identifier) which is required for said communication device to connect with said access point, and
said second setting value which is required for said communication device to connect with said communication terminal includes the ESSID created by said communication device.

7. A communication terminal, which communicates with a communication device, comprising:
an information acquisition unit that acquires information concerning a communication state of said communication device; and
a wireless LAN communication unit that operates either in a station (STA) mode for connecting with an access point or in an AP mode for operating as the access point based on said acquired information,
said communication terminal connecting with said access point in the case of operating in said STA mode, and said communication device connecting with said communication terminal in the case of operating in said AP mode,
wherein said information includes a first setting value required for said communication terminal to connect with said access point when said communication device connects with said access point, or a second setting value required for said communication device to connect with said communication terminal when said communication device does not connect with said access point.

8. A communication device which communicates with a communication terminal, comprising:
an information provision unit that provides information concerning a communication state to said communication terminal, which operates either in a station (STA) mode for connecting with an access point or in an AP mode for operating as the access point based on the information concerning said communication state,
said communication terminal connecting with said access point in the case that said communication terminal operates in said STA mode, and said communication device connecting with said communication terminal in the case that said communication terminal operates in said AP mode,
wherein said information includes a first setting value required for said communication terminal to connect with said access point when said communication device connects with said access point, or a second setting value required for said communication device to connect with said communication terminal when said communication device does not connect with said access point.

9. A communication control method for controlling a communication between a communication terminal and a communication device, comprising:
   acquiring information concerning a communication state of said communication device, and
   either (1) operating said communication terminal in a station (STA) mode and connecting said communication terminal with an access point, or (2) operating said communication terminal in an access point (AP) mode and connecting said communication device with said communication terminal, based on the information concerning said communication state,
   wherein said information includes a first setting value required for said communication terminal to connect with said access point when said communication device connects with said access point, or a second setting value required for said communication device to connect with said communication terminal when said communication device does not connect with said access point.

10. A non-transitory computer readable medium storing a program, causing a computer to execute a communication control process for controlling a communication between a communication terminal and a communication device, the communication control process comprising:
   acquiring information concerning a communication state of said communication device; and
   either (1) operating said communication terminal in a station (STA) mode and connecting said communication terminal with an access point, or (2) operating said communication terminal in an access point (AP) mode and connecting said communication device with said communication terminal, based on the information concerning said communication state,
   wherein said information includes a first setting value required for said communication terminal to connect with said access point when said communication device connects with said access point, or a second setting value required for said communication device to connect with said communication terminal when said communication device does not connect with said access point.

11. A communication system, comprising:
   a communication device; and
   a communication terminal which communicates with said communication device, and comprises:
      an information acquisition means for acquiring information on a communication state of said communication device, said information being provided by an information provision means of said communication device; and
      a wireless LAN communication means for operating either in a station (STA) mode for connecting with an access point or in an AP mode for operating as the access point based on said acquired information,
   said communication terminal connecting with said access point in the case that said communication terminal operates in said STA mode, and said communication device connecting with said communication terminal in the case that said communication terminal operates in said AP mode,
   wherein said information includes a first setting value required for said communication terminal to connect with said access point when said communication device connects with said access point, or a second setting value required for said communication device to connect with said communication terminal when said communication device does not connect with said access point.

12. A communication terminal, which communicates with a communication device, comprising:
   an information acquisition means for acquiring information concerning a communication state of said communication device; and
   a wireless LAN communication means for operating either in a station (STA) mode for connecting with an access point or in an AP mode for operating as the access point based on said acquired information,
   said communication terminal connecting with said access point in the case of operating in said STA mode, and said communication device connecting with said communication terminal in the case of operating in said AP mode,
   wherein said information includes a first setting value required for said communication terminal to connect with said access point when said communication device connects with said access point, or a second setting value required for said communication device to connect with said communication terminal when said communication device does not connect with said access point.

13. A communication device which communicates with a communication terminal, comprising:
   an information provision means for providing information concerning a communication state to said communication terminal, which operates either in a station (STA) mode for connecting with an access point or in an AP mode for operating as the access point based on the information concerning said communication state,
   said communication terminal connecting with said access point in the case that said communication terminal operates in said STA mode, and said communication device connecting with said communication terminal in the case that said communication terminal operates in said AP mode,
   wherein said information includes a first setting value required for said communication terminal to connect with said access point when said communication device connects with said access point, or a second setting value required for said communication device to connect with said communication terminal when said communication device does not connect with said access point.

* * * * *